United States Patent
Lee et al.

(10) Patent No.: US 10,523,302 B2
(45) Date of Patent: Dec. 31, 2019

(54) APPARATUS AND METHOD FOR SELECTING BEAM PATTERN IN COMMUNICATION SYSTEM SUPPORTING BEAMFORMING SCHEME

(71) Applicants: Samsung Electronics Co., Ltd, Suwon-si (KR); Korea University Research and Business Foundation, Seoul (KR)

(72) Inventors: Inkyu Lee, Seoul (KR); Jong-Ho Oh, Suwon-si (KR); Bong-Jin Kim, Suwon-si (KR); Tae-Yeong Kim, Seoul (KR); Min-Ki Ahn, Seoul (KR); Tae-Seok Oh, Seoul (KR); Seok-Ju Jang, Seoul (KR)

(73) Assignees: Samsung Electronics Co., Ltd., Suwon-si (KR); Korea University Research and Business Foundation, Seoul (KR)

( * ) Notice: Subject to any disclaimer, the term of this patent is extended or adjusted under 35 U.S.C. 154(b) by 74 days.

(21) Appl. No.: 15/763,002

(22) PCT Filed: Sep. 23, 2016

(86) PCT No.: PCT/KR2016/010700
§ 371 (c)(1),
(2) Date: Mar. 23, 2018

(87) PCT Pub. No.: WO2017/052295
PCT Pub. Date: Mar. 30, 2017

(65) Prior Publication Data
US 2018/0262255 A1 Sep. 13, 2018

(30) Foreign Application Priority Data
Sep. 24, 2015 (KR) .......................... 10-2015-0135836

(51) Int. Cl.
*H04B 7/06* (2006.01)
*H04B 7/04* (2017.01)
(Continued)

(52) U.S. Cl.
CPC ............. *H04B 7/0695* (2013.01); *H04B 7/04* (2013.01); *H04B 7/0491* (2013.01); *H04B 7/06* (2013.01);
(Continued)

(58) Field of Classification Search
None
See application file for complete search history.

(56) References Cited

U.S. PATENT DOCUMENTS 8,331,265 B2 * 12/2012 Yong .................... H04B 7/0695
370/254
8,422,961 B2 * 4/2013 Kafle ........................ H01Q 3/26
455/67.14
(Continued)

FOREIGN PATENT DOCUMENTS

KR 10-2014-0057908 A 5/2014
KR 10-2016-0125779 A 11/2016

OTHER PUBLICATIONS

International Search Report dated Dec. 22, 2016 in connection with International Patent Application No. PCT/KR2016/010700.
(Continued)

*Primary Examiner* — Andrew C Oh

(57) ABSTRACT

The present invention relates to a 5th-generation (5G) or pre-5G communication system which is provided for supporting a higher data transfer rate after a 4th-generation (4G) communication system such as a long term evolution (LTE). The present invention provides a method for selecting, by an access point (AP), a beam in a communication system supporting a beamforming scheme, the method comprising:
(Continued)

a step of transmitting information which indicates whether or not a duplicated beacon transmission interval (BTI) is operated; and a step of performing a transmit sector sweep (TXSS) process at least twice during the duplicated BTI.

20 Claims, 17 Drawing Sheets

(51) Int. Cl.
    *H04B 7/08*         (2006.01)
    *H04B 7/0491*    (2017.01)

(52) U.S. Cl.
    CPC ............. *H04B 7/0617* (2013.01); *H04B 7/08* (2013.01); *H04B 7/088* (2013.01)

(56) References Cited

U.S. PATENT DOCUMENTS

| | | | | |
|---|---|---|---|---|
| 8,477,813 B2* | 7/2013 | Zhang | ............... | H04L 25/03343 370/510 |
| 8,509,130 B2* | 8/2013 | Liu | ...................... | H04B 7/0695 342/367 |
| 8,767,683 B2* | 7/2014 | Liu | ...................... | H04B 7/0617 370/336 |
| 8,817,756 B1* | 8/2014 | Hart | ...................... | H04W 74/04 370/337 |
| 8,818,278 B2* | 8/2014 | Levy | ..................... | H04W 8/005 455/41.2 |
| 8,843,076 B2* | 9/2014 | Trainin | ................. | H04W 24/00 455/67.11 |
| 8,879,516 B2* | 11/2014 | Liu | ................... | H04W 72/0446 370/336 |
| 9,048,894 B2* | 6/2015 | Wang | ..................... | H04B 7/043 |
| 9,225,401 B2* | 12/2015 | Wang | ................... | H04B 7/0695 |
| 9,258,046 B2* | 2/2016 | Sinha | ................... | H04B 7/0491 |
| 9,629,122 B2* | 4/2017 | Yoon | ..................... | H04W 72/02 |
| 9,629,171 B2* | 4/2017 | Roy | ..................... | H04W 16/28 |
| 9,674,712 B2* | 6/2017 | Takahashi | ............. | H04W 16/28 |
| 9,680,546 B2* | 6/2017 | Trainin | ................. | H04B 7/0617 |
| 9,712,221 B2* | 7/2017 | Trainin | ................. | H04B 7/0617 |
| 9,722,726 B2* | 8/2017 | Kasher | ................. | H04L 1/0001 |
| 9,936,352 B2* | 4/2018 | Sanderovich | ......... | H04W 4/023 |
| 9,998,184 B2* | 6/2018 | Kasher | .................... | H04B 7/043 |
| 10,056,958 B2* | 8/2018 | Rajagopal | ............. | H04B 7/063 |
| 10,103,796 B2* | 10/2018 | Levy | .................... | H04B 7/0617 |
| 2010/0214169 A1* | 8/2010 | Kafle | ....................... | H01Q 3/26 342/368 |
| 2010/0265924 A1 | 10/2010 | Yong et al. | | |
| 2013/0044695 A1* | 2/2013 | Xu | ....................... | H04B 7/0619 370/329 |
| 2013/0252548 A1* | 9/2013 | Levy | .................... | H04W 8/005 455/41.2 |
| 2014/0204827 A1 | 7/2014 | Grandhi et al. | | |
| 2015/0071185 A1* | 3/2015 | Trainin | ................ | H04B 7/0617 370/329 |
| 2015/0244432 A1* | 8/2015 | Wang | ................... | H04B 7/0695 375/267 |
| 2015/0382171 A1* | 12/2015 | Roy | ..................... | H04W 48/16 370/329 |
| 2016/0119043 A1* | 4/2016 | Rajagopal | ............. | H04B 7/063 370/329 |
| 2016/0241314 A1* | 8/2016 | Ferrante | ........... | H04W 72/0406 |
| 2017/0064583 A1* | 3/2017 | Roy | ..................... | H04W 36/0005 |
| 2017/0086211 A1* | 3/2017 | Sahin | .................... | H04W 74/04 |
| 2017/0150419 A1* | 5/2017 | Li | .......................... | H04B 7/024 |

OTHER PUBLICATIONS

Written Opinion of the International Searching Authority dated Dec. 22, 2016 in connection with International Patent Application No. PCT/KR2016/010700.

\* cited by examiner

APPARATUS AND METHOD FOR SELECTING BEAM PATTERN IN COMMUNICATION SYSTEM SUPPORTING BEAMFORMING SCHEME

CROSS-REFERENCE TO RELATED APPLICATIONS

This application is a 371 of International Application No. PCT/KR2016/010700 filed Sep. 23, 2016, which claims to Korean Patent Application No. 10-2015-0135836 filed on Sep. 24, 2015, in the Korean Intellectual Property Office, the disclosures of which are herein incorporated by reference in their entirety.

TECHNICAL FIELD

The present disclosure relates generally to an apparatus and method for selecting a beam pattern in a communication system supporting a beamforming scheme, and more particularly, to an apparatus and method for selecting a uplink transmission beam pattern based on downlink transmission beam pattern information in a communication system supporting a beamforming scheme.

BACKGROUND

To meet the demand for wireless data traffic, which has increased since deployment of 4th-generation (4G) communication systems, efforts have been made to develop an improved 5th-generation (5G) or pre-5G communication system. Therefore, the 5G or pre-5G communication system is also called a 'beyond 4G network' or a 'post long-term evolution (LTE) system'.

It is considered that the 5G communication system will be implemented in millimeter wave (mmWave) bands, e.g., 60 GHz bands, so as to accomplish higher data rates. To reduce propagation loss of radio waves and increase a transmission distance, a beam forming technique, a massive multiple-input multiple-output (MIMO) technique, a full dimensional MIMO (FD-MIMO) technique, an array antenna technique, an analog beam forming technique, and a large scale antenna technique are discussed in 5G communication systems.

In addition, in 5G communication systems, development for system network improvement is under way based on advanced small cells, cloud radio access networks (RANs), ultra-dense networks, a device-to-device (D2D) communication, a wireless backhaul, a moving network, a cooperative communication, coordinated multi-points (CoMP), reception-end interference cancellation, and the like.

In the 5G system, a hybrid frequency shift keying (FSK) and quadrature amplitude modulation (QAM) modulation (FQAM) and a sliding window superposition coding (SWSC) as an advanced coding modulation (ACM) scheme, and a filter bank multi carrier (FBMC) scheme, a non-orthogonal multiple Access (NOMA) scheme, and a sparse code multiple access (SCMA) scheme as an advanced access technology have been developed.

Communication systems have been developed to support a higher data rate to meet ever-increasing demand for radio data traffic.

Meanwhile, communication systems proposed up to now have developed various schemes for mainly improving a spectral efficiency for increasing a data rate, however, it is difficult to satisfy explosive demand for radio data traffic with only the schemes for improving the spectral efficiency.

So, various schemes have been proposed for satisfying the explosive demand for the data traffic, and a typical one is a scheme of using a very wide frequency band, e.g., an mmWave frequency band.

It is very difficult to obtain a wide frequency band in a frequency band (<5 GHz) used in a current mobile communication cellular system, so there is a need for obtaining an mmWave band in a frequency band higher than the frequency band used in the current mobile communication cellular system. That is, communication schemes in an existing frequency band, e.g., 300 MHz~3 GHz have already reached a saturation state, so it is difficult to implement a 5G system which requires high data transmission throughput. So, new communication schemes using an mmWave band as a frequency band higher than an existing frequency band have been studied.

Meanwhile, a wavelength of a radio wave in the mmWave band is very short, which is several millimeters, due to this, signal attenuation is great compared to a communication channel which exists in an existing frequency band and a signal is not distributed, so a transmission/reception coverage significantly decreases.

So, a study of a beamforming scheme using a plurality of antennas in a signal transmitting apparatus and a signal receiving apparatus has been actively progressed for solving decrease of a transmission/reception coverage.

The above information is presented as background information only to assist with an understanding of the present disclosure. No determination has been made, and no assertion is made, as to whether any of the above might be applicable as prior art with regard to the present disclosure.

SUMMARY

An embodiment of the present disclosure proposes an apparatus and method for selecting a beam pattern in a communication system supporting a beamforming scheme.

An embodiment of the present disclosure proposes an apparatus and method for selecting a uplink transmission beam pattern based on downlink transmission beam pattern information in a communication system supporting a beamforming scheme.

An embodiment of the present disclosure proposes an apparatus and method for selecting a beam pattern based on a duplicated beacon transmit interval (BTI) in a communication system supporting a beamforming scheme.

An embodiment of the present disclosure proposes an apparatus and method for selecting a beam pattern based on at least two initiator transmit sector sweep (I-TXSS) processes in a communication system supporting a beamforming scheme.

An embodiment of the present disclosure proposes an apparatus and method for selecting a beam pattern such that beam pattern selecting time may be decreased in a communication system supporting a beamforming scheme.

An embodiment of the present disclosure proposes an apparatus and method for selecting a beam pattern such that complexity for beam selection may be decreased in a communication system supporting a beamforming scheme.

An embodiment of the present disclosure provides a method for selecting a beam by an access point (AP) in a communication system supporting a beamforming scheme. The method comprises transmitting information indicating whether to operate a duplicated beacon transmit interval (BTI), and performing a transmit sector sweep (TXSS) process at least twice during the duplicated BTI.

An embodiment of the present disclosure provides a method for selecting a beam by a station (STA) in a communication system supporting a beamforming scheme. The method comprises receiving information indicating whether to operate a duplicated beacon transmit interval (BTI), and performing a receive sector sweep (RXSS) process at least twice during the duplicated BTI.

An embodiment of the present disclosure provides an access point (AP) in a communication system supporting a beamforming scheme. The AP comprises a transceiver, wherein the transceiver performs an operation of transmitting information indicating whether to operate a duplicated beacon transmit interval (BTI), and performs an operation of performing a transmit sector sweep (TXSS) process at least twice during the duplicated BTI.

An embodiment of the present disclosure provides a station (STA) in a communication system supporting a beamforming scheme. The STA comprises a transceiver, wherein the transceiver performs an operation of receiving information indicating whether to operate a duplicated beacon transmit interval (BTI), and performs an operation of performing a receive sector sweep (RXSS) process at least twice during the duplicated BTI.

Other aspects, advantages, and salient features of the disclosure will become apparent to those skilled in the art from the following detailed description, which, taken in conjunction with the annexed drawings, discloses exemplary embodiments of the disclosure.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

An embodiment of the present disclosure proposes enables to select a beam pattern in a communication system supporting a beamforming scheme.

An embodiment of the present disclosure enables to select a uplink transmission beam pattern based on downlink transmission beam pattern information in a communication system supporting a beamforming scheme.

An embodiment of the present disclosure enables to select a beam pattern based on a duplicated BTI in a communication system supporting a beamforming scheme.

An embodiment of the present disclosure enables to select a beam pattern based on at least two I-TXSS processes in a communication system supporting a beamforming scheme.

An embodiment of the present disclosure enables to select a beam pattern such that beam pattern selecting time may be decreased in a communication system supporting a beamforming scheme.

An embodiment of the present disclosure enables to select a beam pattern such that complexity for beam selection may be decreased in a communication system supporting a beamforming scheme.

BRIEF DESCRIPTION OF DRAWINGS

The above and other aspects, features and advantages of certain exemplary embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
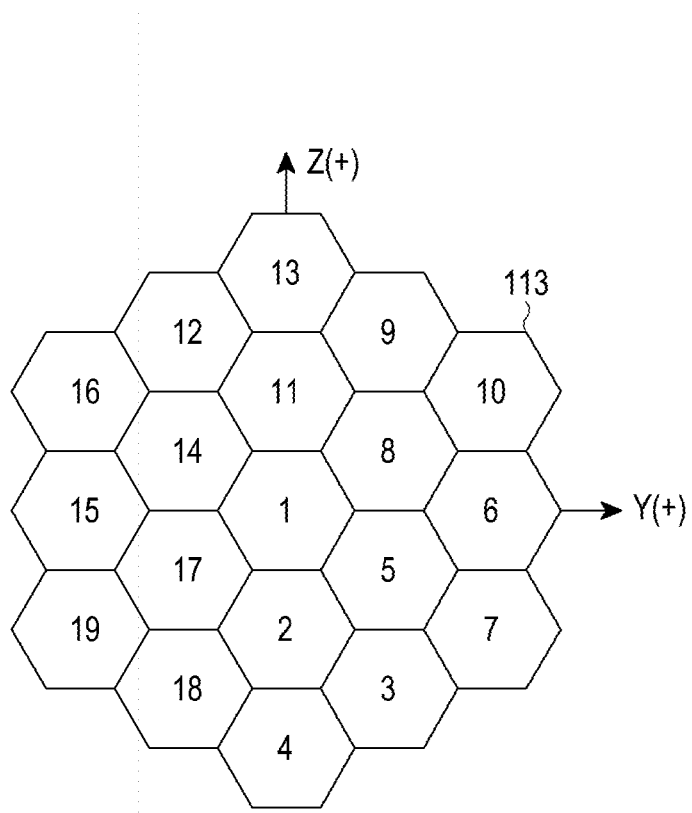
FIG. 1 schematically illustrates a process of detecting an optimal transmission beam and an optimal reception beam based on an RF beam set in a general mmWave communication system.

The following detailed description, which refers to the accompanying drawings, will serve to provide a comprehensive understanding of the various embodiments of the present disclosure, which are defined by the claims and the equivalents of the claims. The following detailed description includes various specific details for the sake of understanding, but is to be construed as merely an example. Accordingly, those skilled in the art will recognize that various changes and modifications of the various embodiments described herein may be made without departing from the scope and spirit of this disclosure. Furthermore, the description of well-known functions and constructions may be omitted for clarity and conciseness.

The terms and words used in the following detailed description and claims are not intended to be limited in terms of language, but merely as being used to enable a clear and consistent understanding of the disclosure by the inventor. So, it should be clear that it is to be understood by those skilled in the art that the following detailed description of various embodiments of the disclosure is provided for illustrative purposes only and is not provided for limiting the present disclosure, as defined by the appended claims and equivalents of the claims.

It is to be understood that the singular forms "a," "an," and "the" include plural referents unless the context clearly dictates otherwise. Thus, for example, reference to "a component surface" includes reference to one or more of such surfaces.

Although ordinal numbers such as "first," "second," and so forth will be used to describe various components, those components are not limited herein. The terms are used only for distinguishing one component from another component. For example, a first component may be referred to as a second component and likewise, a second component may also be referred to as a first component, without departing from the teaching of the inventive concept. The term "and/or" used herein includes any and all combinations of one or more of the associated listed items.

The terminology used herein is for the purpose of describing various embodiments only and is not intended to be limiting. As used herein, the singular forms are intended to include the plural forms as well, unless the context clearly indicates otherwise. It will be further understood that the terms "comprises" and/or "has," when used in this specification, specify the presence of a stated feature, number, step, operation, component, element, or combination thereof, but do not preclude the presence or addition of one or more other features, numbers, steps, operations, components, elements, or combinations thereof.

Further, in embodiments of the present disclosure, the terms used herein, including technical and scientific terms, have the same meanings as terms that are generally understood by those skilled in the art, as long as the terms are not differently defined. It should be analyzed that terms defined in a generally-used dictionary have meanings coinciding with those of terms in the related technology, and it is not analyzed that the terms have ideal or overly formal meanings, as long as the terms are clearly defined in an embodiment of the present disclosure.

According to various embodiments of the present disclosure, an electronic device may include communication functionality. For example, an electronic device may be a smart phone, a tablet personal computer (PC), a mobile phone, a video phone, an e-book reader, a desktop PC, a laptop PC, a netbook PC, a personal digital assistant (PDA), a portable multimedia player (PMP), an mp3 player, a mobile medical device, a camera, a wearable device (e.g., a head-mounted device (HMD), electronic clothes, electronic braces, an electronic necklace, an electronic appcessory, an electronic tattoo, or a smart watch), and/or the like.

According to various embodiments of the present disclosure, an electronic device may be a smart home appliance with communication functionality. A smart home appliance may be, for example, a television, a digital video disk (DVD) player, an audio, a refrigerator, an air conditioner, a vacuum cleaner, an oven, a microwave oven, a washer, a dryer, an air purifier, a set-top box, a TV box (e.g., Samsung HomeSync™, Apple TV™, or Google TV™), a gaming console, an electronic dictionary, an electronic key, a camcorder, an electronic picture frame, and/or the like.

According to various embodiments of the present disclosure, an electronic device may be a medical device (e.g., magnetic resonance angiography (MRA) device, a magnetic resonance imaging (MRI) device, computed tomography (CT) device, an imaging device, or an ultrasonic device), a navigation device, a global positioning system (GPS) receiver, an event data recorder (EDR), a flight data recorder (FDR), an automotive infotainment device, a naval electronic device (e.g., naval navigation device, gyroscope, or compass), an avionic electronic device, a security device, an industrial or consumer robot, and/or the like.

According to various embodiments of the present disclosure, an electronic device may be furniture, part of a building/structure, an electronic board, electronic signature receiving device, a projector, various measuring devices (e.g., water, electricity, gas or electro-magnetic wave measuring devices), and/or the like that include communication functionality.

According to various embodiments of the present disclosure, an electronic device may be any combination of the foregoing devices. In addition, it will be apparent to one having ordinary skill in the art that an electronic device according to various embodiments of the present disclosure is not limited to the foregoing devices.

According to various embodiments of the present disclosure, a station (STA) may be, for example, an electronic device.

According to various embodiments of the present disclosure, an STA may be a signal transmitting apparatus or a signal receiving apparatus, and an access point (AP) may be a signal transmitting apparatus or a signal receiving apparatus.

In various embodiments of the present disclosure, it will be noted that the term STA may be interchangeable with the terms user terminal, terminal, wireless communication terminal, mobile station (MS), wireless terminal, mobile device, user equipment (UE), and/or the like.

In various embodiments of the present disclosure, it will be noted that the term AP may be interchangeable with the terms base station (BS), enhanced node B (eNB), and/or the like.

An embodiment of the present disclosure proposes an apparatus and method for selecting a beam pattern in a communication system supporting a beamforming scheme.

An embodiment of the present disclosure proposes an apparatus and method for selecting a uplink transmission beam pattern based on downlink transmission beam pattern information in a communication system supporting a beamforming scheme.

An embodiment of the present disclosure proposes an apparatus and method for selecting a beam pattern based on a duplicated beacon transmit interval (BTI) in a communication system supporting a beamforming scheme.

An embodiment of the present disclosure proposes an apparatus and method for selecting a beam pattern based on at least two initiator transmit sector sweep (I-TXSS) processes in a communication system supporting a beamforming scheme.

An embodiment of the present disclosure proposes an apparatus and method for selecting a beam pattern such that beam pattern selecting time may be decreased in a communication system supporting a beamforming scheme.

An embodiment of the present disclosure proposes an apparatus and method for selecting a beam pattern such that complexity for beam selection may be decreased in a communication system supporting a beamforming scheme.

An apparatus and method proposed in an embodiment of the present disclosure may be applied to various communication systems such as a long term evolution (LTE) mobile communication system, an LTE-advanced (LTE-A) mobile communication system, a licensed-assisted access (LAA)-LTE mobile communication system, a high speed downlink packet access (HSDPA) mobile communication system, a high speed uplink packet access (HSDPA) mobile communication system, a high rate packet data (HRPD) mobile communication system proposed in a $3^{rd}$ generation partnership project 2 (3GPP2), a wideband code division multiple access (WCDMA) mobile communication system proposed in the 3GPP2, a code division multiple access (CDMA) mobile communication system proposed in the 3GPP2, an institute of electrical and electronics engineers (IEEE) 802.16ad communication system, an IEEE 802.16m communication system, an IEEE 802.16e communication system, an evolved packet system (EPS), and a mobile internet protocol (Mobile IP) system, and/or the like.

A beamforming scheme denotes a scheme for obtaining a high signal to noise ratio (SNR) by forming an antenna beam in a specific direction using an antenna space in a multi-input multi-output (MIMO) system in which each of a signal transmitting apparatus and a signal receiving apparatus uses a plurality of antennas.

The beamforming scheme may be classified into a digital beamforming scheme and a radio frequency (RF) beamforming scheme, and the beamforming scheme will be described below.

The digital beamforming scheme forms a beam by multiplying a signal modulated in each RF chain with a specific factor, so all of a signal transmitting apparatus and a signal receiving apparatus need to include the same number of RF chains as the number of antennas. However, cost of an RF chain in a high frequency channel is very expensive and energy consumption of the RF chain in the high frequency channel is very high, so there are many limitations on implementation of the digital beamforming scheme.

So, a millimeter wave (mmWave) system considers use of an RF beamforming scheme for forming a beam in an analog end by adjusting a phase in each antenna. That is, the RF beamforming scheme may solve a signal attenuation phenomenon in an mmWave channel using a beam pattern with directionality, so the mmWave system considers uses of the RF beamforming scheme.

So, an IEEE 802.11ad communication system which considers a 60 GHz band supports a protocol which is based on an RF beamforming scheme, i.e., an RF beamforming protocol. The RF beamforming protocol includes a sector level sweep (SLS) process, a beam refinement protocol (BRP) process, a beam tracking protocol process, and/or the like.

Meanwhile, an SLS process supported in a general IEEE 802.11ad communication system will be described below.

First, an AP performs an initiator transmit sector sweep (I-TXSS) process, and an STA performs a signal receiving process in an omni-directional (omni) reception mode. At this time, the STA determines an optimal transmission sector, i.e., an optimal transmission beam pattern of the AP while performing the signal receiving process, and feeds back information related to the determined optimal transmission sector of the AP to the AP if the STA performs a transmit sector sweep process.

Like this, the AP determines an optimal transmission sector of the STA while performing a signal receiving process, and feeds back information related to the determined optimal transmission sector of the STA to the STA if the AP performs a transmit sector sweep process.

In this case, the AP and the STA may know information related to an optimal transmission sector each other. So, if information related to an optimal reception sector is additionally required, the STA may determine an optimal reception sector of the STA by performing a receive sector sweep process in a BRP process.

Further, the general IEEE 802.11ad communication system supports a responder transmit sector sweep (R-TXSS) as a process in which an STA performs a transmit sector sweep process in an association beam forming training (A-BFT) interval, and an AP performs a signal receiving process in omni reception mode.

In the R-TXSS process, transmission power of the STA is less than transmission power of the AP, so a coverage thereof decreases, this coverage decrease may render beam setting impossible.

Meanwhile, a channel model considered in an embodiment of the present disclosure will be described below.

First, a communication using an mmWave band has a characteristic that dispersibility is small since path loss is relatively high in a free space.

So, a characteristic of an mmWave channel may be mathematically expressed using a cluster channel model. The cluster channel model assumes that there are a plurality of channel paths, e.g., $N_{ray}$ channel paths in each of a plurality of clusters, e.g., $N_{cl}$ clusters.

Here, it will be defined that an azimuth which is formed by the lth ray formed in the ith cluster and a transmission antenna is $\phi_{il}^t$. Further, it will be defined that an elevation angle which is formed by the lth ray formed in the ith cluster and the transmission antenna is $\theta_{il}^t$. It will be defined that an azimuth which is formed by the lth ray formed in the ith cluster and a reception antenna is $\phi_{il}^r$. Further, it will be defined that an elevation angle which is formed by the lth ray formed in the ith cluster and the reception antenna is $\theta_{il}^r$.

Upon defining the azimuth formed by the lth ray formed in the ith cluster and the transmission antenna, the elevation angle formed by the lth ray formed in the ith cluster and the transmission antenna, the azimuth formed by the lth ray formed in the ith cluster and the reception antenna, and the elevation angle formed by the lth ray formed in the ith cluster and the reception antenna, as described above, an mmWave cluster channel may be expressed as Equation (1).

$$H = \gamma \sum_{i,l} \alpha_{il} a_r(\phi_{il}^r, \theta_{il}^r) a_t(\phi_{il}^t, \theta_{il}^t)^H \qquad \text{Equation 1}$$

In Equation (1), $$\gamma = \sqrt{\frac{N_t, N_r}{N_{cl} N_{ray}}}$$

denotes a normalization factor of a channel H, and $\alpha_{il} \sim CN(0, 1)$ denote complex channel gain which corresponds to the lth ray of the ith cluster.

In Equation (1), $a_t(\phi_{il}^t, \theta_{il}^t)$ denotes a normalization transmission array response vector, and $a_r(\phi_{il}^r, \theta_{il}^r)$ denotes a normalization reception array response vector. Here, an array response vector may be defined as Equation (2) in a uniform planar array (UPA) antenna including a plurality of antenna elements, e.g., N=W×H antenna elements.

$$a_{UPA}(\phi, \theta) = \frac{1}{\sqrt{N}} \left[ 1, \ldots, e^{jkd\left(\frac{m\sin(\phi)\sin(\theta)+}{n\cos(\theta)}\right)}, \ldots, e^{jkd\left(\frac{(W-1)\sin(\phi)\sin(\theta)+}{(H-1)\cos(\theta)}\right)} \right]^T \qquad \text{Equation 2}$$

In Equation (2), $k = 2\pi/\Delta$ and d denotes a distance between antenna elements.

In Equation (2), m and n are an index indicating the mth antenna element in a horizontal axis among antenna elements included in a uniform planar array antenna and an index indicating the nth antenna element in a vertical axis among the antenna elements included in the uniform planar array antenna, respectively, and a range of m and a range of n are $0 \le m \le W$ and $0 \le n \le H$, respectively.

Meanwhile, an embodiment of the present disclosure considers a single user single stream-mmWave communication system. Here, in an embodiment of the present disclosure, in a single user single stream-mmWave communication system, a signal receiving apparatus includes one RF chain even though the signal receiving apparatus uses a plurality of antennas.

In the single user single stream-mmWave communication system, a received signal y may be expressed as Equation (3).

$$y = \sqrt{\rho} w_{RF}^H H f_{RF} s + w_{RF}^H n \qquad \text{Equation 3}$$

In Equation (3), $f_{RF}$ denotes a transmission RF beam vector, and $w_{RF}$ denotes a reception RF beam vector. The transmission RF beam vector $f_{RF}$ and the reception RF beam vector $w_{RF}$ may be expressed as Equation (4) for each of an azimuth and an elevation angle.

$$f_{RF}(\phi_i^t, \theta_i^t) = \frac{1}{\sqrt{N}} \left[ 1, \ldots, e^{jkd\left(\frac{m\sin(\phi_i^t)\sin(\theta_i^t)+}{n\cos(\theta_i^t)}\right)}, \ldots, e^{jkd\left(\frac{(W-1)\sin(\phi_i^t)\sin(\theta_i^t)+}{(H-1)\cos(\theta_i^t)}\right)} \right]^T$$

$$w_{RF}(\phi_i^r, \theta_i^r) = \frac{1}{\sqrt{N}} \left[ 1, \ldots, e^{jkd\left(\frac{m\sin(\phi_i^r)\sin(\theta_i^r)+}{n\cos(\theta_i^r)}\right)}, \ldots, e^{jkd\left(\frac{(W-1)\sin(\phi_i^r)\sin(\theta_i^r)+}{(H-1)\cos(\theta_i^r)}\right)} \right]^T$$

Equation 4

In Equation (4), s denotes data to be transmitted, and n denotes a noise vector which follows Gaussian distribution.

Meanwhile, an mmWave communication system basically uses a plurality of transmission antenna elements and a plurality of reception antenna elements, however, the number of RF chains is generally smaller than the number of antenna elements, so it may be practically difficult to exactly detect an mmWave cluster channel as expressed in Equation (1), i.e., a channel H. Therefore, it may be very difficult to exactly detect an RF beamforming value and a digital beamforming value using a hybrid beamforming scheme in the mmWave communication system.

So, a scheme of dividing a coverage with isotropic to generate an RF beam set, and detecting an optimal transmission beam and an optimal reception beam based on this may be more practical than a scheme of exactly detecting an analog beamforming value and a digital beamforming value using a hybrid beamforming scheme, and this will be described with reference to FIG. 1.

FIG. 1 schematically illustrates a process of detecting an optimal transmission beam and an optimal reception beam based on an RF beam set in a general mmWave communication system.

Referring to FIG. 1, an RF beam set 211 is generated by dividing a coverage with isotropic. Here, the RF beam set 111 includes total 19 RF beam elements, i.e., an RF beam element #1 to an RF beam element #19. Corresponding azimuth information az and elevation angle information El are mapped to each of RF elements, and a corresponding coverage is determined based on the azimuth information az and the elevation angle information El (113).

So, an AP or STA may perform a sector sweep process based on the RF beam set 111 to detect an optimal transmission beam or optimal reception beam.

A process of detecting an optimal transmission beam and an optimal reception beam based on an RF beam set in a general mmWave communication system has been described with reference to FIG. 1, and a process of detecting an optimal transmission beam and an optimal reception beam based on an RF beam set in a general IEEE 802.11ad communication system will be described with reference to FIG. 2.

Figure 2:
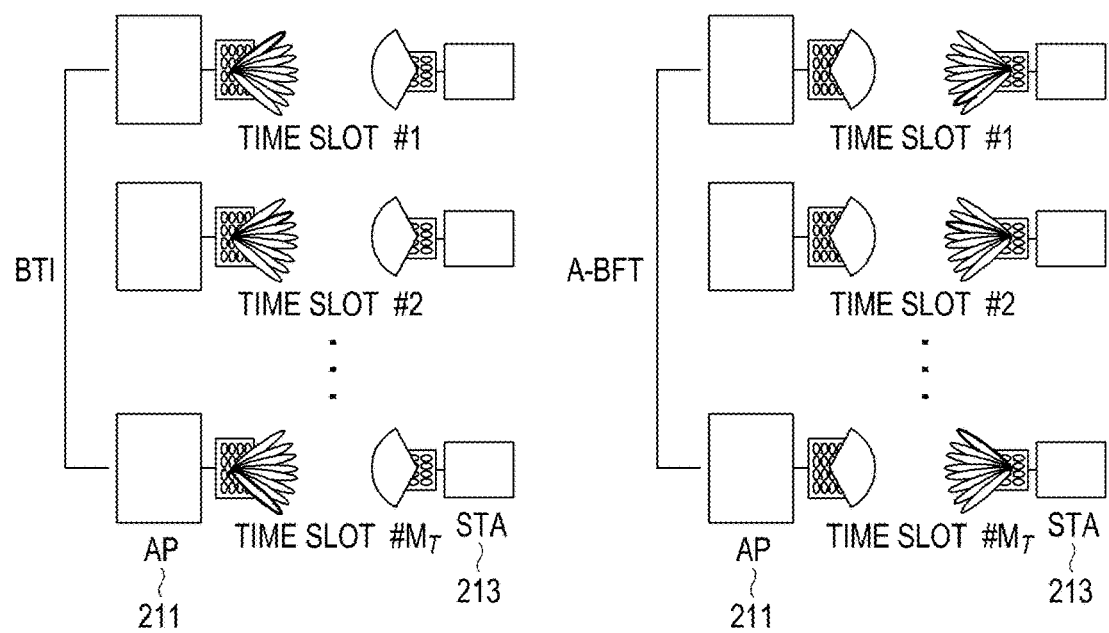
FIG. 2 schematically illustrates a process of detecting an optimal transmission beam and an optimal reception beam based on an RF beam set in a general IEEE 802.11ad communication system.

FIG. 2 schematically illustrates a process of detecting an optimal transmission beam and an optimal reception beam based on an RF beam set in a general IEEE 802.11ad communication system.

Referring to FIG. 2, an I-TXSS process of an SLS process is performed in a beacon transmit interval (BTI). In the I-TXSS process, an AP 211 performs transmission by changing a sector within an RF beam set in sequence in each time slot as shown in FIG. 2.

Further, an STA 213 performs a signal receiving process in an omni reception mode. Here, the omni reception mode denotes a mode in which a signal is uniformly received for all directions. The STA 213 stores an index for a transmission sector of the AP which has maximum gain among received signals received during the BTI.

After the transmit sector sweep process of the AP 211 is completed, an R-TXSS process in which the STA 213 performs a transmit sector sweep process and the AP 211 performs a signal receiving process in an omni reception mode in an A-BFT interval is performed.

If the AP 211 performs the signal receiving process in the omni reception mode, transmission power of the STA 213 is relatively less than transmission power of the AP 211, so a case that the AP 211 does not exist within a coverage of the STA 213 may occur, and this will be described with reference to FIG. 3.

Figure 3:
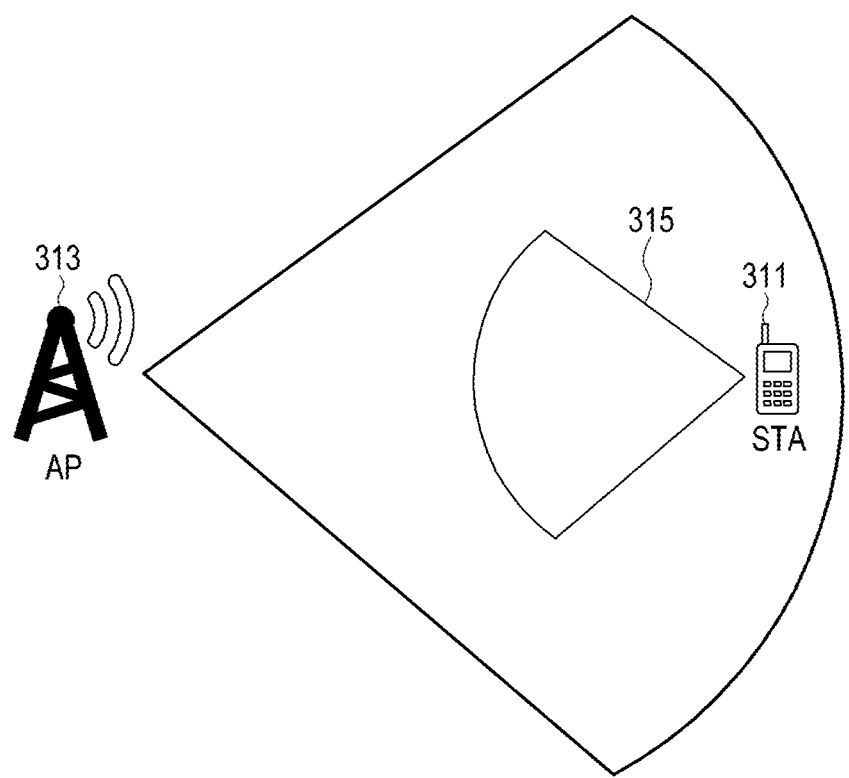
FIG. 3 schematically illustrates a case that an AP does not exist within a coverage of an STA when an R-TXSS process is performed in a general IEEE 802.11ad communication system.

FIG. 3 schematically illustrates a case that an AP does not exist within a coverage of an STA when an R-TXSS process is performed in a general IEEE 802.11ad communication system.

Referring to FIG. 3, in an A-BFT interval, an R-TXSS process in which an STA 311 performs a transmit sector sweep process, and an AP 313 performs a signal receiving process in an omni reception mode is performed.

If the AP 313 performs the signal receiving process in the omni reception mode, transmission power of the STA 311 is relatively less than transmission power of the AP 313, a case that the AP 313 does not exist within a coverage 315 of the STA 311 may occur.

If the case that the AP 313 does not exist within the coverage 315 of the STA 311 occurs, the R-TXSS process may not normally be performed, so beam setting may also become impossible.

For solving a coverage issue of an STA, an embodiment of the present disclosure will consider a scheme in which an STA performs a signal transmitting process with an optimal transmission sector, and an AP performs a signal receiving process based on a specific reception sector, not an omni reception mode to increase antenna gain.

For increasing the antenna gain by performing the signal transmitting process with the optimal transmission sector in the STA and performing the signal receiving process based on the specific reception sector, not the omni reception mode in the AP, there is a need for a scheme of estimating an optimal transmission section of the STA.

The scheme of estimating the optimal transmission section of the STA may be implemented in the same manner as a scheme of estimating an optimal reception sector based on channel reciprocity.

In a beamforming protocol specified in a general IEEE 802.11ad communication system, an optimal reception sector of an STA is determined through an initiator receive sector sweep (I-RXSS) process in a BRP process. Here, gain $\zeta_i$ of a received signal which corresponds to the ith reception sector may be defined as Equation (5).

$$\zeta_i = |w(\phi_i^r, \theta_i^r)^H \times H \times f_{omni}|, i \in [1, \ldots, N_{sector}] \quad \text{Equation 5}$$

In Equation (5), $\phi_i^r$ denotes an azimuth of the ith reception sector within a reception sector set, $\theta_i^r$ denotes an elevation angle of the ith reception sector within the reception sector set, and $w(\phi_i^r, \theta_i^r)$ denotes a reception array response vector which corresponds to a corresponding sector.

Here, a scheme of detecting the optimal reception sector of the STA may be expressed as a scheme of detecting a reception sector which maximizes a data rate as expressed in Equation (6).

$$\text{Best } Rx \text{ sector index} = \underset{i}{\operatorname{argmax}} \log_2\left(1 + \frac{P|w(\phi_i^r, \theta_i^r)^H \times H \times f_{omni}|^2}{\sigma_n^2}\right)$$

$$\text{s.t. } i \in \{1, \ldots, N_{sector}\} \quad \text{Equation 6}$$

In Equation (6), Best Rx sector index denotes an index of a reception sector which maximizes a data rate.

In a case that a beamforming protocol specified in a general IEEE 802.11ad communication system is used, for determining the optimal reception sector of the STA in order to solve the coverage issue of the STA, a BRP process needs to be performed after an SLS process is performed.

So, time consumed for setting a beam becomes very long, and a latency issue occurs since a plurality of feedback operations are performed. Further, if transmission power of an STA is not sufficient, overall reliability of a beamforming protocol for beam setting may be degraded due to a coverage issue.

So, an embodiment of the present disclosure proposes a scheme of estimating an optimal reception sector of an STA based on information received during a BTI in order to solve issues which may occur when a beam is set in a case that the beamforming protocol specified in the general IEEE 802.11ad communication system is used.

A transmit sector sweep process in an mmWave communication system supporting a beamforming scheme according to an embodiment of the present disclosure will be described with reference to FIG. 4.

Figure 4:
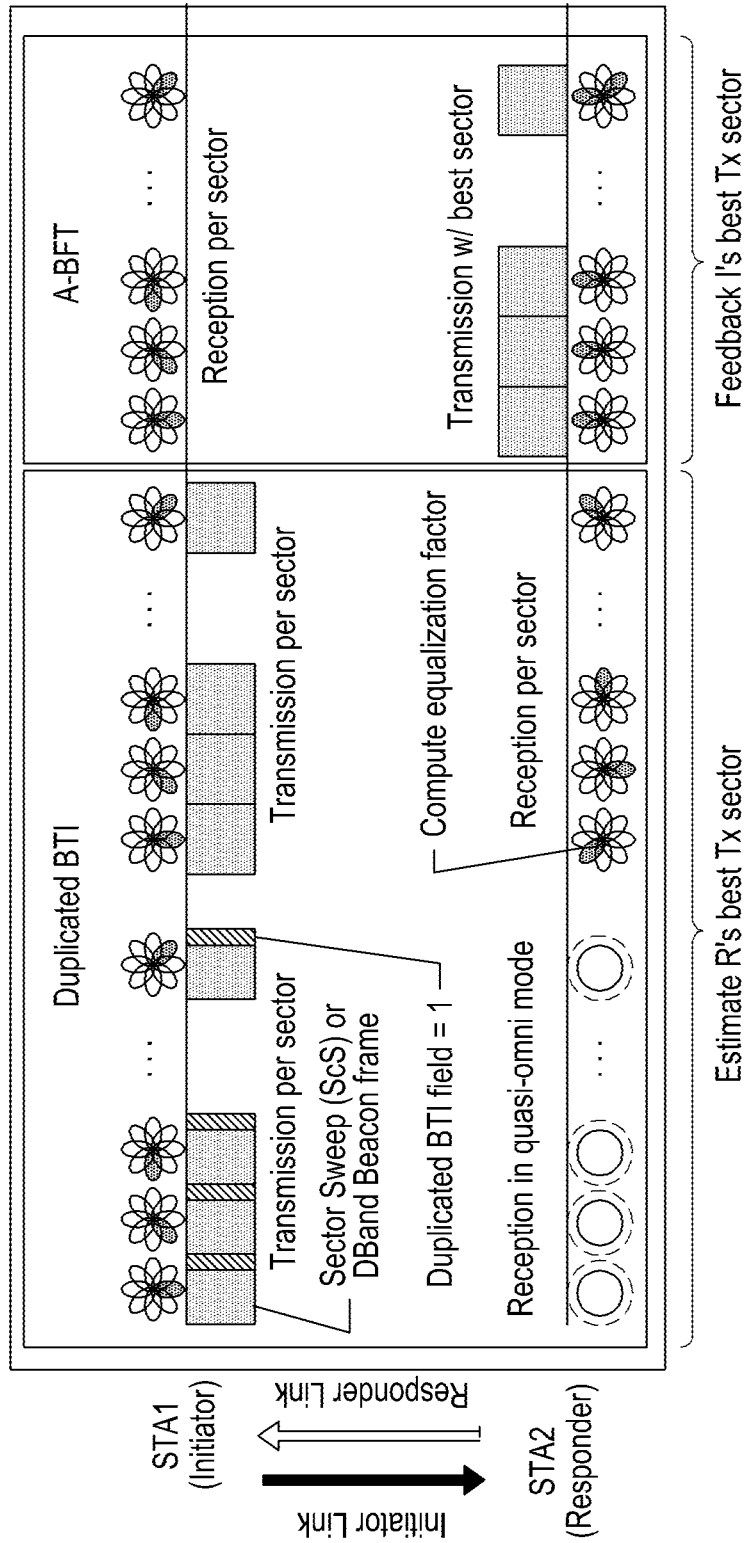
FIG. 4 schematically illustrates a transmit sector sweep process in an mmWave communication system supporting a beamforming scheme according to an embodiment of the present disclosure.

FIG. 4 schematically illustrates a transmit sector sweep process in an mmWave communication system supporting a beamforming scheme according to an embodiment of the present disclosure.

Referring to FIG. 4, a transmit sector sweep process proposed in an embodiment of the present disclosure is a transmit sector sweep process performed in a new time interval, i.e., a duplicated BTI.

In a BTI defined in a general IEEE 802.11ad communication system, a transmit sector sweep process is performed once. It may be difficult to estimate an optimal reception sector of an STA with only information received during the one transmit sector sweep process.

So, in an embodiment of the present disclosure, a transmit sector sweep process is performed a number of times, e.g., twice during a new time interval, i.e., a duplicated BTI, and an optimal reception sector is estimated based on information received while the transmit sector sweep process is performed twice. That is, information amount which the STA may obtain in a transmit sector sweep process proposed in an embodiment of the present disclosure is twice as much as that of a transmit sector sweep process of a general IEEE 802.11ad communication system, so the optimal reception sector of the STA is estimated based on the information of the increased amount.

Unlike a general BTI, for supporting the duplicated BTI, a duplicated BTI field may be added into a sector frame when the first transmit sector sweep process is performed.

The duplicated BTI field is a field indicating whether an AP operates a duplicated BTI, and may be implemented with, for example, 1 bit. If a field value of the duplicated BTI field is, for example, 1, the duplicated BTI field indicates that the AP operates the duplicated BTI. If the field value of the duplicated BTI field is, for example, 0, the duplicated BTI field indicates that the AP does not operate the duplicated BTI.

In an embodiment of the present disclosure, a case that the duplicated BTI field indicates whether the AP operates the duplicated BTI has been described, however, whether the AP operates the duplicated BTI may be indicated with various forms as well as the duplicated BTI field. For example, the AP may indicate whether the AP operates the duplicated BTI to a corresponding STA using a dedicated message.

If the duplicated BTI is operated, an STA does not perform a transmit sector sweep process of the STA in an A-BFT interval after the first transmit sector sweep process, i.e., the first transmit sector sweep process of an AP is completed, and performs a receive sector sweep process corresponding to the second transmit sector sweep process, i.e., the second transmit sector sweep process of the AP in the duplicated BTI. The STA performs two receive sector sweep processes corresponding to the two transmit sector sweep processes of the AP, and then estimates an optimal transmission sector of the STA using an equalizer scheme proposed in an embodiment of the present disclosure.

In FIG. 4, for convenience, it will be noted that the AP is shown as "STA1", and the STA is shown as "STA2".

In order to solve a coverage issue of an STA and more simply detect an optimal reception sector of the STA, an embodiment of the present disclosure proposes an equalizer scheme in which an AP may virtually implement I-RXSS process by performing an I-TXSS process a number of times, e.g., twice during a new interval, i.e., a duplicated BTI. If the equalizer scheme is applied based on information obtained in the duplicated BTI, it is possible to obtain the same effect as a case that an I-TXSS process and an I-RXSS process are continuously performed. That is, if the duplicated BTI is operated and the equalizer scheme is used, an optimal transmission sector of an AP and an optimal reception sector of an STA may be estimated.

An equalizer scheme proposed in an embodiment of the present disclosure will be described below.

The first I-TXSS process is performed in the same manner as an I-TXSS process of a general IEEE 802.11ad communication system, and it will be defined that gain of a received signal of an STA which corresponds to each transmission sector of an AP is an equalizing factor of a corresponding transmission sector. Here, an equalizing factor $\gamma_i$ for the ith transmission sector may be defined as Equation (7).

$$\gamma_i = |w_{omni}^H H f(\phi_i^t, \theta_i^t)| \qquad \text{Equation 7}$$

Figure 5:
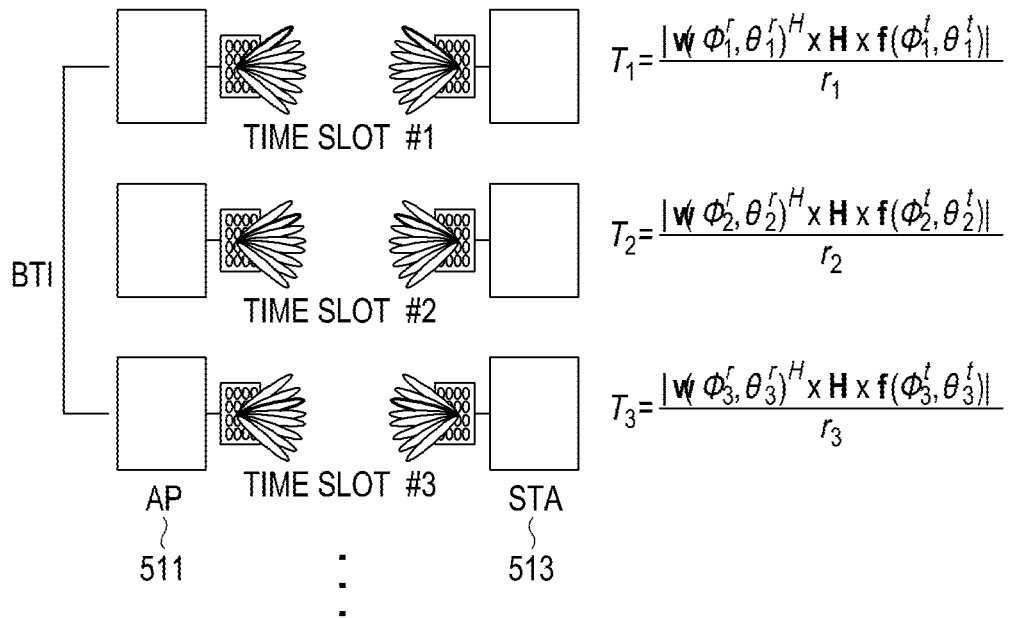
FIG. 5 schematically illustrates $T_j$ according to an equalizer scheme in an mmWave communication system according to an embodiment of the present disclosure.

Next, in the second I-TXSS process, unlike an I-TXSS process of a general IEEE 802.11ad communication system, an STA does not perform a signal receiving process in an omni reception mode and performs a signal receiving process by randomly changing a reception sector every unit time interval, e.g., every time slot. At this time, it will be defined that a value generated by dividing gain of a received signal obtained using the ith transmission sector and the jth reception sector by the equalizing factor $\gamma_i$ for the ith transmission vector is $T_j$, and $T_j$ may be expressed as Equation in FIG. 5. FIG. 5 schematically illustrates $T_j$ according to an equalizer scheme in an mmWave communication system according to an embodiment of the present disclosure.

$T_j$ may be expressed as Equation (8).

$$T_j = \frac{|w(\phi_j^r, \theta_j^r)^H H f(\phi_i^t, \theta_i^t)|}{\gamma_i} = \frac{|w(\phi_j^r, \theta_j^r)^H A_r \Sigma A_t^H f(\phi_i^t, \theta_i^t)|}{|w_{omni}^H A_r \Sigma A_t^H f(\phi_i^t, \theta_i^t)|} \qquad \text{Equation 8}$$

If a Cauchy-Schwarz inequality is applied to a numerator and a denominator at the same time, Equation (8) may be approximated as expressed in Equation (9).

$$T_j = \frac{|w(\phi_j^r, \theta_j^r)^H A_r \Sigma A_t^H f(\phi_i^t, \theta_i^t)|}{|w_{omni}^H A_r \Sigma A_t^H f(\phi_i^t, \theta_i^t)|} \underset{\text{Cauchy-Schwarz ineq.}}{\cong} \qquad \text{Equation 9}$$

$$\frac{\|w(\phi_j^r, \theta_j^r)^H A_r \Sigma\| \|A_t^H f(\phi_i^t, \theta_i^t)\|}{\|w_{omni}^H A_r \Sigma\| \|A_t^H f(\phi_i^t, \theta_i^t)\|} = \frac{\|w(\phi_j^r, \theta_j^r)^H A_r \Sigma\|}{\|w_{omni}^H A_r \Sigma\|}$$

As expressed in Equation (9), it will be easily understood that an equal sign is established if a channel is composed of only a single path. This means that an equalizing factor is normally operated if there is only one dominant path in a channel, and accuracy of Equation (9), i.e., approximated $T_j$ is increased.

Referring to a final form of an approximate expression as expressed in Equation (9), it will be understood that term $f(\phi_i^t, \theta_i^t)$ in each of the numerator and the denominator is reduced and disappears. That is, a same effect as an I-RXSS process in which an AP performs a transmitting process in an omni transmission mode and an STA sweeps a reception sector may be virtually implemented by removing effect of a transmission sector of the AP on gain of a received signal.

So, an optimal reception sector of an STA may be estimated based on $T_j$ value collected by the STA during the second BTI as expressed in Equation (10).

$$\text{Best } Rx \text{ sector index} = \underset{j}{\operatorname{argmax}} T_j \qquad \text{Equation 10}$$

$$\text{s.t. } j \in \{1, \ldots, N_{sector}\}$$

As described above, accuracy of an equalizer scheme proposed in an embodiment of the present disclosure increases if there is one dominant path in a channel. So, if there is line of sight (LOS) or the number of paths which are on a channel is small, performance of the equalizer scheme proposed in an embodiment of the present disclosure increases.

Unlike this, if the number of paths which are on the channel is large, and channel gains of the paths are similar, it may be difficult to exactly estimate an optimal reception sector of the STA due to decrease of accuracy of the approximate expression.

So, in an embodiment of the present disclosure, an AP additionally performs an I-TXSS process to increase performance of an equalizer scheme proposed in an embodiment of the present disclosure.

In an equalizer scheme proposed in an embodiment of the present disclosure as described above, an AP estimates an optimal reception sector of an STA by additionally performing an I-TXSS process. However, in a case that the number of paths which are on a channel is large and channel gains of the paths are similar, even though the equalizer scheme is used, an error in an approximate expression increases, so it may be difficult to estimate the optimal reception sector of the STA.

So, the AP may estimate an optimal reception sector of an STA by additionally performing an I-TXSS process a number of times, e.g., twice after performing the equalizer scheme, i.e., by performing the I-TXSS process three times. In this case, performance of estimating the optimal reception section in the STA increases. In this case, a probability that sectors of which performance is good between a signal transmitting apparatus and a signal receiving apparatus are paired is increased by adding ordering of the equalizer scheme in an I-TXSS process which is thirdly performed based on reception gain in an I-TXSS process which is secondly performed.

Here, a scheme of estimating an optimal reception sector of an STA by performing total three I-TXSS processes will be referred to as "extended equalizer scheme", and the extended equalizer scheme will be described below.

In the first I-TXSS process, an STA detects an optimal transmission sector of an AP and orders indexes of a transmission sector of the AP in order of magnitude of gain.

In the second I-TXSS process, the STA virtually performs an I-RXSS process using an equalizer scheme, and orders indexes of a reception sector of the STA in order of magnitude of gain.

Here, a transmit-receive pair (Tx-Rx pair) may be generated based on an order of the indexes of the transmission sector detected in the first I-TXSS process and an order of the indexes of the reception sector detected in the second I-TXSS process, and this will be described with reference to FIG. 6.

Figure 6:
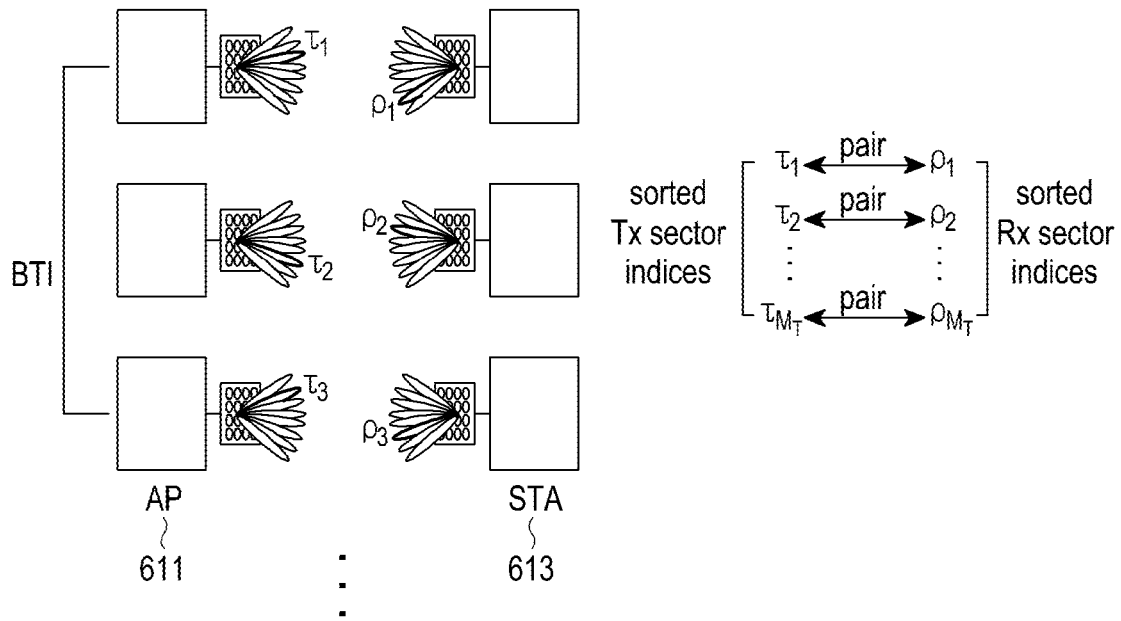
FIG. 6 schematically illustrates a Tx-Rx pair generated based on an extended equalizer scheme in an mmWave communication system supporting a beamforming scheme according to an embodiment of the present disclosure.

FIG. 6 schematically illustrates a Tx-Rx pair generated based on an extended equalizer scheme in an mmWave communication system supporting a beamforming scheme according to an embodiment of the present disclosure.

Referring to FIG. 6, based on an extended equalizer scheme in the first I-TXSS process, an STA 613 detects an optimal transmission sector of an AP 611 and orders indexes of a transmission sector of the AP 611 in order of magnitude of gain. In the second I-TXSS process, the STA 613 virtually performs an I-RXSS process, and then orders indexes of a reception sector of the STA 613 in order of magnitude of gain.

As shown in FIG. 6, a Tx-Rx pair is generated by mapping an order $\{\tau_1, \tau_2, \ldots, \tau_{M_T}\}$ of indexes of the transmission sector detected in the first I-TXSS process and an order $\{\rho_1, \rho_2, \ldots, \rho_{M_T}\}$ of indexes of the reception sector detected in the second I-TXSS process in sequence.

Meanwhile, in the third I-TXSS process of the extended equalizer scheme, gain is measured while changing a transmission sector and a reception sector based on the Tx-Rx pair which is generated based on the result of the first I-TXSS process and the result of the second I-TXSS process as described in FIG. 6.

If an STA applies the equalizer scheme, the STA determines a reception sector which has a maximum result value as an optimal reception sector of the STA.

As described above, if there are a plurality of paths, not a single path on a channel in a case of an equalizer scheme, a probability that an optimal reception sector may be exactly estimated may be decreased, so an embodiment of the present disclosure proposes an extended equalizer scheme thereby increasing the probability that the optimal reception sector may be exactly estimated.

Next, performance of an equalizer scheme according to an embodiment of the present disclosure will be described below.

Prior to description of performance of an equalizer scheme according to an embodiment of the present disclosure, it will be noted that various simulation results to be described below are obtained under a simulation environment as shown in Table 1.

TABLE 1

| System Parameter | Value |
| --- | --- |
| System bandwidth | 1.728 GHz |
| Tx power | 10 dBm |
| Noise figure | 10 dB |
| Antenna model | Basic steerable directional antenna model |
| Maximum antenna gain | 16 dB |
| Coverage region | 100° |
| HPBW of the beam sector | 30° |
| # of beam sectors | 19 |
| HPBW for the omni mode | 100° |
| Maximum antenna gain of the Omni-mode | 7 dB |

In Table 1, System bandwidth indicates a system bandwidth and is set to 1.728 GHz, Tx power indicates transmission power and is set to 10 dBm, Noise figure indicates a noise index and is set to 10 dB, Antenna model indicates an antenna model and is a basic steerable directional antenna model, Maximum antenna gain indicates a maximum antenna gain and is set to 16 dB, Coverage region indicates a coverage region and is set to 100°, HPBW of the beam sector indicates a half power beam width (HPBW) of a beam sector and is set to 30°, # of beam sectors indicates the number of beam sectors and is set to 19, HPBW for the omni mode indicates an HPBW for an omni mode and is set to 100°, and Maximum antenna gain of the Omni-mode indicates maximum antenna gain for the omni mode and is set to 7 dB.

Meanwhile, it will be noted that the following simulations detect a data rate, a degree of a gap between an optimal reception sector and an estimated reception sector (mean of angle gap), and a probability that an optimal reception sector is detected compared to a full search scheme (matching probability) for a full search scheme of detecting an optimal transmission/reception sector for all transmission/reception sector combinations, an I-TXSS & I-RXSS scheme of detecting an optimal transmission sector using an I-TXSS process and detecting an optimal reception sector using an I-RXSS process, an equalizer scheme proposed in an embodiment of the present disclosure, a maximum power ray scheme of determining a transmission/reception sector corresponding to a channel path which has maximum gain in a case of assuming that a channel is known in advance, and an omni mode receiver scheme of detecting a transmission sector using an I-TXSS process and detecting a reception sector using an omni mode, and distribution of a reception sector index determined in each scheme is shown with histogram.

Firstly, a simulation result in a cubicle environment—non LOS (NLOS), far case will be shown as Table 2.

TABLE 2

|  | Full search | I-TXSS & I-RXSS | Equalizer | Maximum power ray | Omni mode receiver |
|---|---|---|---|---|---|
| Rate | 4.09 | 3.81 | 3.81 | 2.65 | 1.43 |
| Mean of angle gap[°] | 0 | 0.3 | 5.3 | — | — |
| Matching probability | 1 | 0.99 | 0.79 | — | — |

As shown in Table 2, in a cubicle environment—NLOS, far case, it will be understood that an equalizer scheme according to an embodiment of the present disclosure has a high probability of detecting an optimal reception sector compared to a full search scheme.

Distribution of a reception sector index determined in each scheme according to a simulation result in a cubicle environment—NLOS, far case as shown in Table 2 will be described with reference to FIG. 7.

Figure 7:
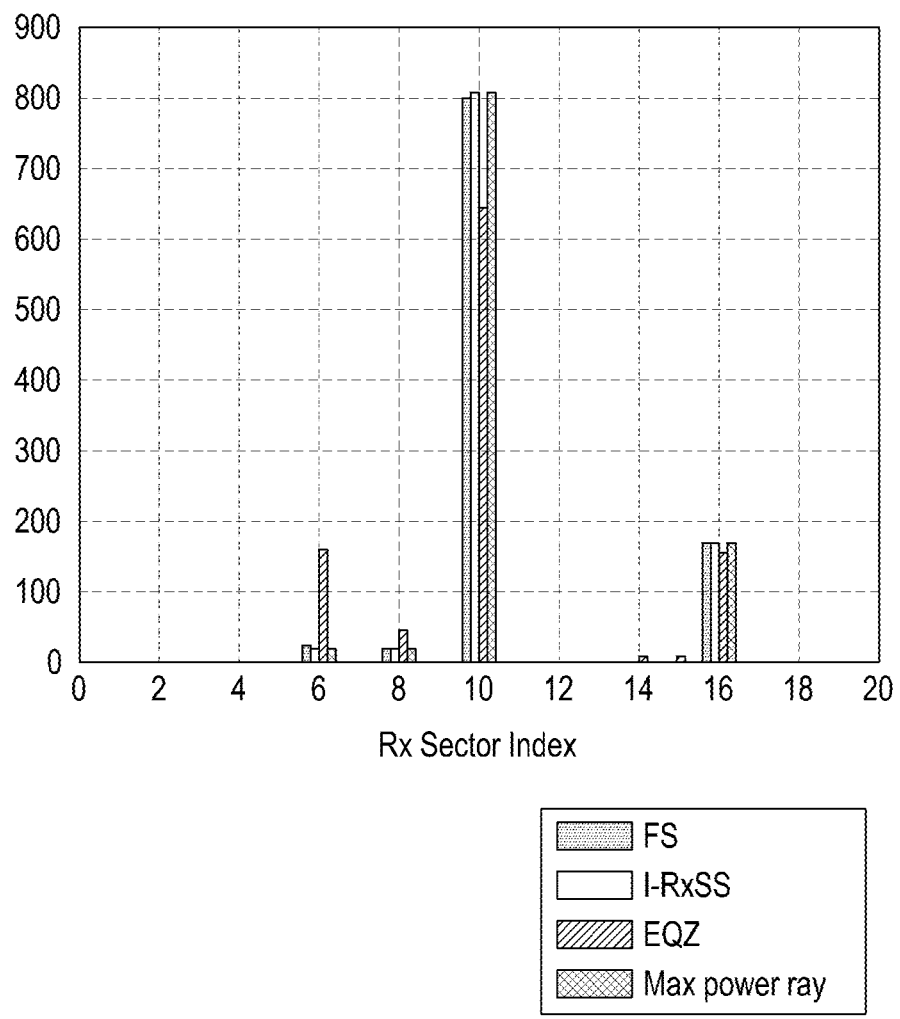
FIG. 7 is a histogram schematically illustrating performance of an equalizer scheme in a cubicle environment—NLOS, far case in an mmWave communication system according to an embodiment of the present disclosure.

FIG. 7 is a histogram schematically illustrating performance of an equalizer scheme in a cubicle environment—NLOS, far case in an mmWave communication system according to an embodiment of the present disclosure.

Referring to FIG. 7, FS indicates a full search scheme, I-RxSS indicates an I-TXSS & I-RXSS scheme, EQZ indicates an equalizer scheme, and Max power ray indicates a maximum power ray scheme.

As shown in FIG. 7, in a cubicle environment—NLOS, far case, it will be understood that an equalizer scheme according to an embodiment of the present disclosure has a high probability of detecting an optimal reception sector compared to a full search scheme.

Secondly, a simulation result in a cubicle environment—LOS, far case will be shown as Table 3.

TABLE 3

|  | Full search | I-TXSS & I-RXSS | Equalizer | Maximum power ray | Omni mode receiver |
|---|---|---|---|---|---|
| Rate | 10.39 | 10.39 | 10.16 | 10.39 | 7.17 |
| Mean of angle gap[°] | 0 | 0 | 1.75 | — | — |
| Matching probability | 1 | 1 | 0.96 | — | — |

As shown in Table 3, in a cubicle environment—LOS, far case, it will be understood that an equalizer scheme according to an embodiment of the present disclosure has a high probability of detecting an optimal reception sector compared to a full search scheme.

Distribution of a reception sector index determined in each scheme according to a simulation result in a cubicle environment—LOS, far case as shown in Table 3 will be described with reference to FIG. 8.

Figure 8:
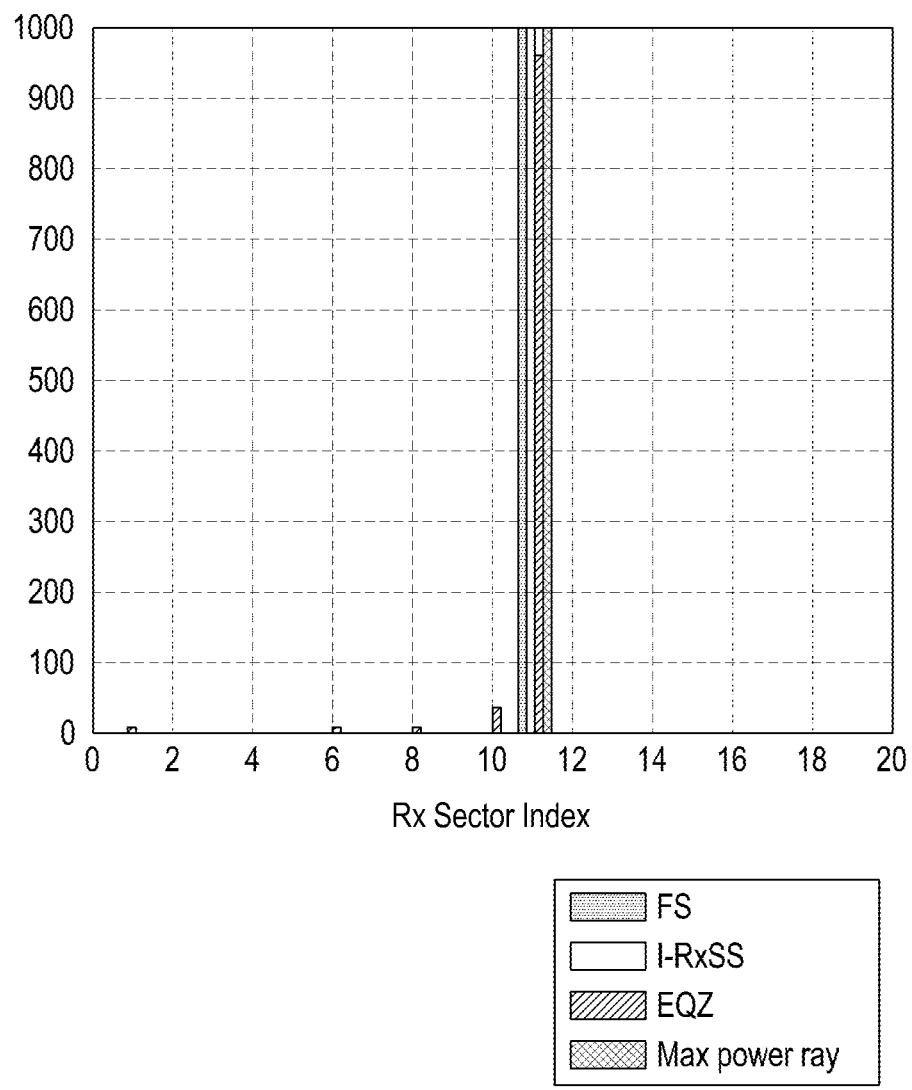
FIG. 8 is a histogram schematically illustrating performance of an equalizer scheme in a cubicle environment—LOS, far case in an mmWave communication system according to an embodiment of the present disclosure.

FIG. 8 is a histogram schematically illustrating performance of an equalizer scheme in a cubicle environment—LOS, far case in an mmWave communication system according to an embodiment of the present disclosure.

Referring to FIG. 8, FS indicates a full search scheme, I-RxSS indicates an I-TXSS & I-RXSS scheme, EQZ indicates an equalizer scheme, and Max power ray indicates a maximum power ray scheme.

As shown in FIG. 8, in a cubicle environment—LOS, far case, it will be understood that an equalizer scheme according to an embodiment of the present disclosure has a high probability of detecting an optimal reception sector compared to a full search scheme.

Thirdly, a simulation result in a cubicle environment—LOS, near case will be shown as Table 4.

TABLE 4

|  | Full search | I-TXSS & I-RXSS | Equalizer | Maximum power ray | Omni mode receiver |
|---|---|---|---|---|---|
| Rate | 12.41 | 12.41 | 12.40 | 12.41 | 8.15 |
| Mean of angle gap[°] | 0 | 0 | 0 | — | — |
| Matching probability | 1 | 1 | 1 | — | — |

As shown in Table 4, in a cubicle environment—LOS, near case, it will be understood that an equalizer scheme according to an embodiment of the present disclosure has a high probability of detecting an optimal reception sector compared to a full search scheme.

Distribution of a reception sector index determined in each scheme according to a simulation result in a cubicle environment—LOS, near case as shown in Table 4 will be described with reference to FIG. 9.

Figure 9:
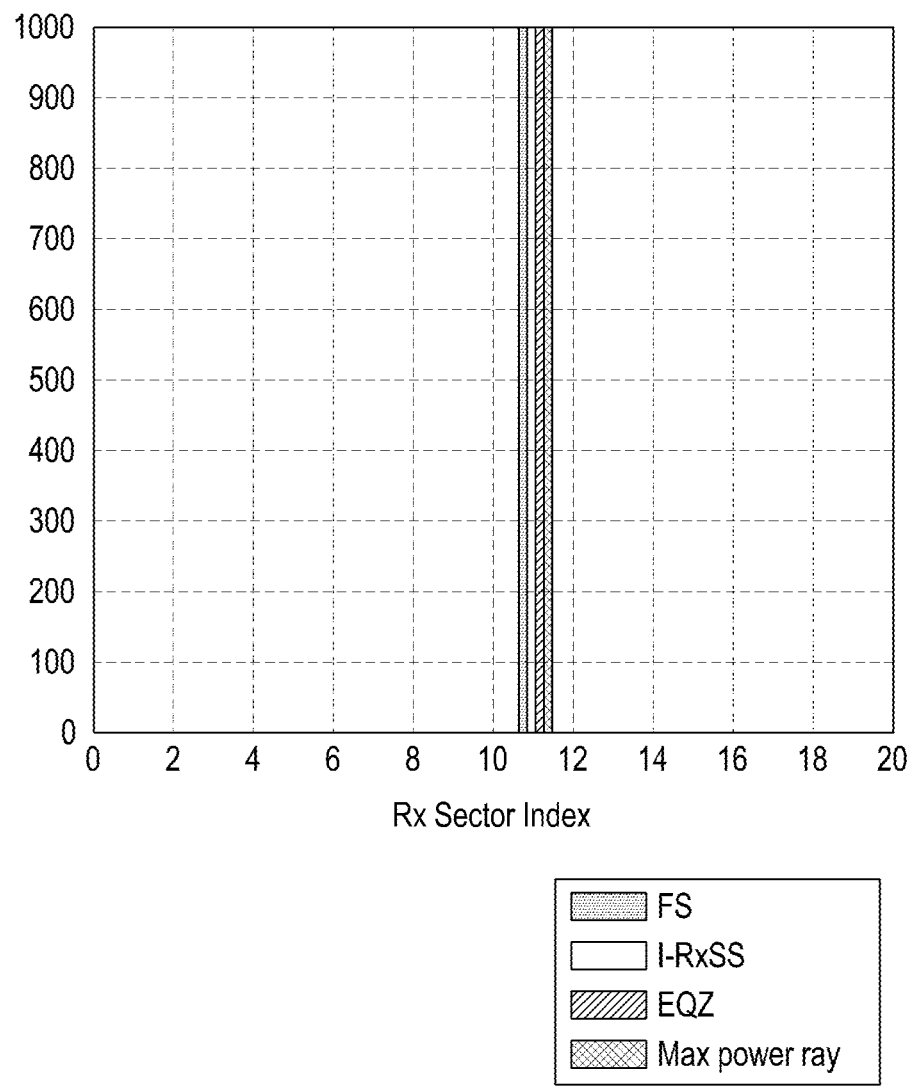
FIG. 9 is a histogram schematically illustrating performance of an equalizer scheme in a cubicle environment—LOS, near case in an mmWave communication system according to an embodiment of the present disclosure.

FIG. 9 is a histogram schematically illustrating performance of an equalizer scheme in a cubicle environment—LOS, near case in an mmWave communication system according to an embodiment of the present disclosure.

Referring to FIG. 9, FS indicates a full search scheme, I-RxSS indicates an I-TXSS & I-RXSS scheme, EQZ indicates an equalizer scheme, and Max power ray indicates a maximum power ray scheme.

As shown in FIG. 9, in a cubicle environment—LOS, near case, it will be understood that an equalizer scheme according to an embodiment of the present disclosure has a high probability of detecting an optimal reception sector compared to a full search scheme.

Simulation results under the cubicle environment, i.e., simulation results as shown in Tables 2 to 4 and FIGS. 7 to 9 will be summarized below.

First, in the cubicle environment—NLOS, far case, it will be understood that a probability of detecting an optimal reception sector of an STA using an equalizer scheme is 79% and less than a probability of detecting the optimal reception sector of the STA using an I-RXSS process, so a degree of a gap between an optimal reception sector and an estimated reception sector (mean of angle gap) is a relatively high value 5.3°.

On the other hand, a cubicle environment—LOS, far case is a scenario in which an AP is far from an STA, e.g., a scenario in which an AP is located at a ceiling, so a sector including an LOS path is, for example, a sector #11. At this time, it will be understood that an equalizer scheme according to an embodiment of the present disclosure has almost same performance as a full search scheme of searching all combinations of a transmission sector and a reception sector to detect an optional transmission sector and an optional reception sector. In this case, it will be understood that a probability of detecting an optimal reception sector of an STA using the equalizer scheme is 96%, which is very excellent performance, and a data rate (rate) is also similar to the full search scheme.

In a cubicle environment—LOS, near case, a distance between an STA and an AP is short, so an assumption that there is LOS is established. So, unlike a cubicle environment—NLOS, far case and a cubicle environment—LOS, far case, the AP is close to the STA, so a sector #13 which is located above a sector #11 becomes a sector including LOS path. In this case, it will be understood that a reception sector detected using an equalizer scheme according to an embodiment of the present disclosure perfectly matches an optimal reception sector. A case that a reception sector detected using an equalizer scheme perfectly matches an optimal reception sector indicates that a channel is represented by one dominant LOS path if there is an LOS path. In this case, as described above, it will be understood that an optimal reception sector may be exactly detected based on an equalizer scheme according to an embodiment of the present disclosure.

Fourthly, a simulation result in a living room environment—LOS case will be shown as Table 5.

TABLE 5

|  | Full search | I-TxSS & I-RxSS | Equalizer | Maximum power ray | Omni mode receiver |
|---|---|---|---|---|---|
| Rate | 11.09 | 11.09 | 9.73 | 11.09 | 7.97 |
| Mean of angle gap[°] | 0 | 0 | 8.9 | — | — |
| Matching probability | 1 | 1 | 0.77 | — | — |

As shown in Table 5, in a living room environment—LOS case, it will be understood that an equalizer scheme according to an embodiment of the present disclosure has a high probability of detecting an optimal reception sector compared to a full search scheme.

Distribution of a reception sector index determined in each scheme according to a simulation result in a living room environment—LOS case as shown in Table 5 will be described with reference to FIG. 10.

Figure 10:
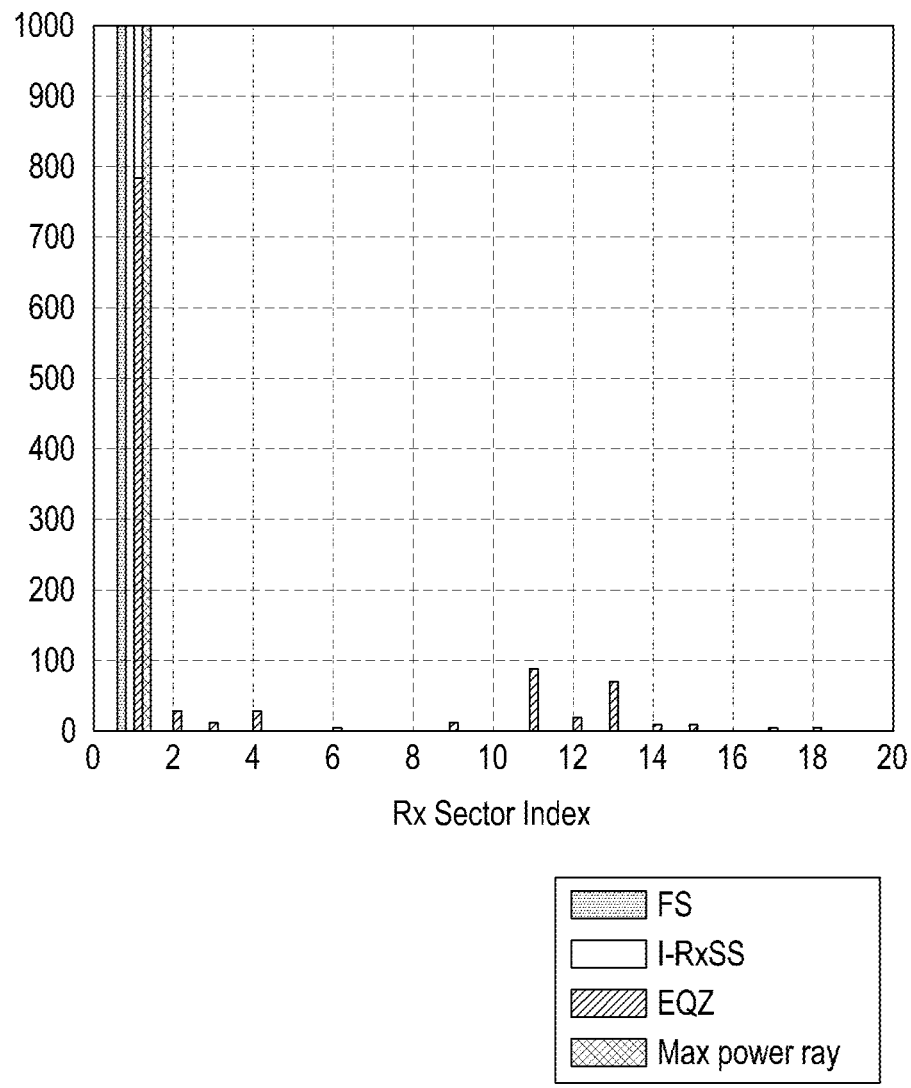
FIG. 10 is a histogram schematically illustrating performance of an equalizer scheme in a living room environment—LOS case in an mmWave communication system according to an embodiment of the present disclosure.

FIG. 10 is a histogram schematically illustrating performance of an equalizer scheme in a living room environment—LOS case in an mmWave communication system according to an embodiment of the present disclosure.

Referring to FIG. 10, FS indicates a full search scheme, I-RxSS indicates an I-TXSS & I-RXSS scheme, EQZ indicates an equalizer scheme, and Max power ray indicates a maximum power ray scheme.

As shown in FIG. 10, in a living room environment—LOS case, it will be understood that an equalizer scheme according to an embodiment of the present disclosure has a high probability of detecting an optimal reception sector compared to a full search scheme.

Fifthly, a simulation result in a living room environment—NLOS case will be shown as Table 6.

TABLE 6

|  | Full search | I-TxSS & I-RxSS | Equalizer | Maximum power ray | Omni mode receiver |
|---|---|---|---|---|---|
| Rate | 6.57 | 6.51 | 5.16 | 4.81 | 3.35 |
| Mean of angle gap[°] | 0 | 1.0 | 18.3 | — | — |
| Matching probability | 1 | 0.98 | 0.61 | — | — |

As shown in Table 6, in a living room environment—NLOS case, it will be understood that an equalizer scheme according to an embodiment of the present disclosure has a high probability of detecting an optimal reception sector compared to a full search scheme.

Distribution of a reception sector index determined in each scheme according to a simulation result in a living room environment—NLOS case as shown in Table 6 will be described with reference to FIG. 11.

Figure 11:
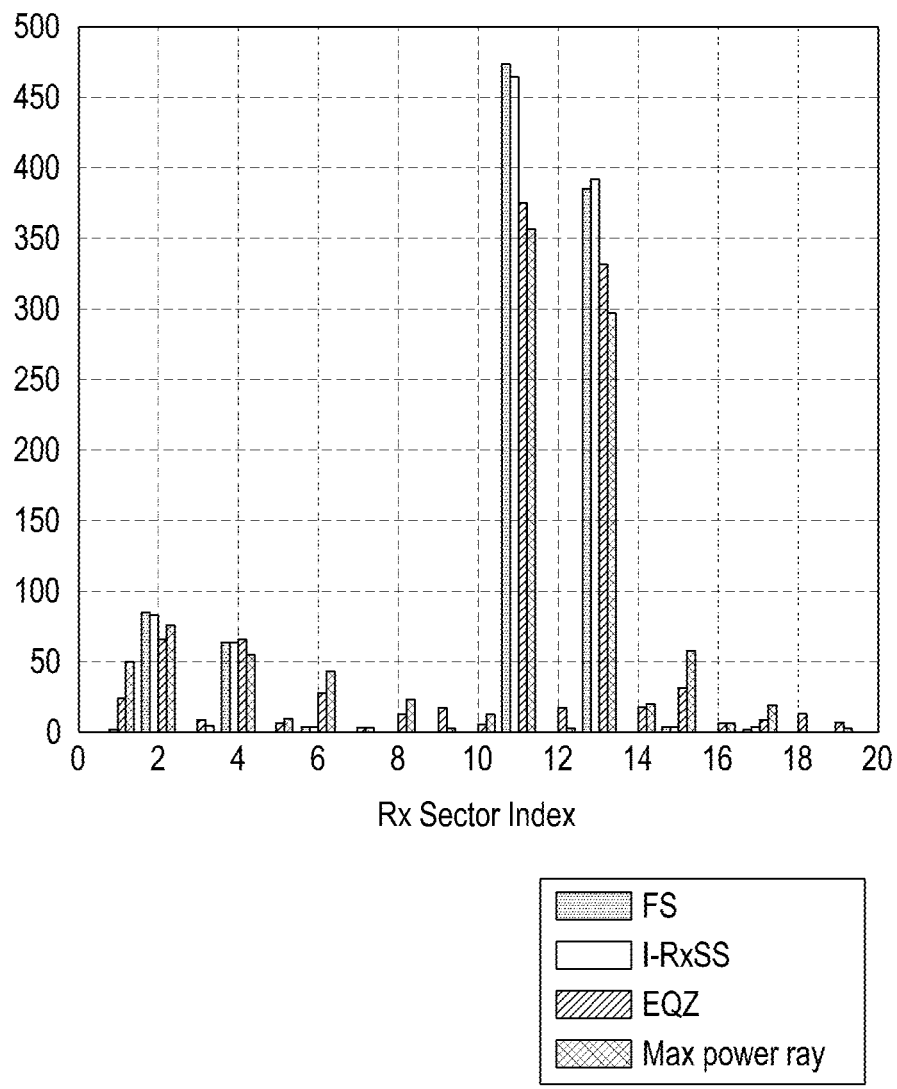
FIG. 11 is a histogram schematically illustrating performance of an equalizer scheme in a living room environment—NLOS case in an mmWave communication system according to an embodiment of the present disclosure.

FIG. 11 is a histogram schematically illustrating performance of an equalizer scheme in a living room environment—NLOS case in an mmWave communication system according to an embodiment of the present disclosure.

Referring to FIG. 11, FS indicates a full search scheme, I-RxSS indicates an I-TXSS & I-RXSS scheme, EQZ indicates an equalizer scheme, and Max power ray indicates a maximum power ray scheme.

As shown in FIG. 11, in a living room environment—NLOS case, it will be understood that an equalizer scheme according to an embodiment of the present disclosure has a high probability of detecting an optimal reception sector compared to a full search scheme.

Simulation results under the living room environment, i.e., simulation results as shown in Tables 5 and 6 and FIGS. 10 and 11 will be summarized below.

First, scenarios under the living room environment may be classified based on whether there is an LOS path. For example, referring to a histogram in a case that there is an LOS path, i.e., a histogram as shown in FIG. 10, it will be understood that a sector #1 including an LOS path is always an optimal reception sector of an STA. At this time, if an equalizer scheme according to an embodiment of the present disclosure is used, an optimal reception sector of an STA may be detected with a probability of about 77%, and a data rate (rate) of 88% may be obtained compared to a full search scheme.

Unlike this, referring to a histogram in a case that there is no LOS path, i.e., a histogram as shown in FIG. 11, it will be understood that an optimal reception sector of an STA is a sector #11 and a sector #13 considering reflection of a ceiling. Further, there is a path reflected from a wall, so it is impossible that a channel is represented by one dominant path. According to this, it will be understood that performance of an equalizer scheme according to an embodiment of the present disclosure is 61%, which is decreased by about 16% compared to a case that there is an LOS path, so a degree of a gap between an optimal reception sector and an estimated reception sector becomes increased.

Sixthly, a simulation result in a conference room environment—LOS, STA-STA case will be shown as Table 7.

TABLE 7

|  | Full search | I-TxSS & I-RxSS | Equalizer | Maximum power ray | Omni mode receiver |
|---|---|---|---|---|---|
| Rate | 13.09 | 13.09 | 12.95 | 13.09 | 9.96 |
| Mean of angle gap[°] | 0 | 0 | 0.8 | — | — |
| Matching probability | 1 | 1 | 0.98 | — | — |

As shown in Table 7, in a conference room environment—LOS, STA-STA case, it will be understood that an equalizer scheme according to an embodiment of the present disclosure has a high probability of detecting an optimal reception sector compared to a full search scheme.

Distribution of a reception sector index determined in each scheme according to a simulation result in a conference room environment—LOS, STA-STA case as shown in Table 7 will be described with reference to FIG. 12.

Figure 12:
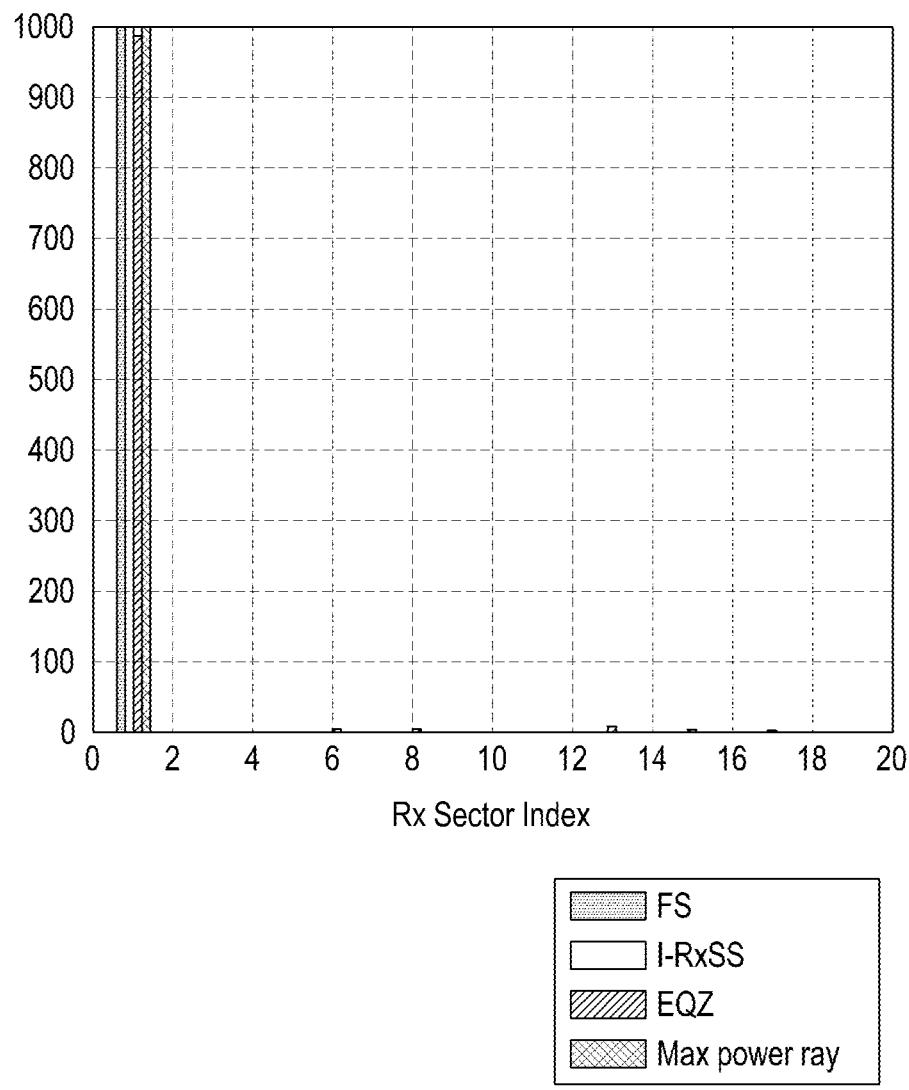
FIG. 12 is a histogram schematically illustrating performance of an equalizer scheme in a conference room environment—LOS, STA-STA case in an mmWave communication system according to an embodiment of the present disclosure.

FIG. 12 is a histogram schematically illustrating performance of an equalizer scheme in a conference room environment—LOS, STA-STA case in an mmWave communication system according to an embodiment of the present disclosure.

Referring to FIG. 12, FS indicates a full search scheme, I-RxSS indicates an I-TXSS & I-RXSS scheme, EQZ indicates an equalizer scheme, and Max power ray indicates a maximum power ray scheme.

As shown in FIG. 12, in a conference room environment—LOS, STA-STA case, it will be understood that an equalizer scheme according to an embodiment of the present disclosure has a high probability of detecting an optimal reception sector compared to a full search scheme.

Seventhly, a simulation result in a conference room environment—LOS, STA-AP case will be shown as Table 8.

TABLE 8

|  | Full search | I-TxSS & I-RxSS | Equalizer | Maximum power ray | Omni mode receiver |
|---|---|---|---|---|---|
| Rate | 11.48 | 11.48 | 11.27 | 11.48 | 7.94 |
| Mean of angle gap[°] | 0 | 0 | 3.1 | — | — |
| Matching probability | 1 | 1 | 0.89 | — | — |

As shown in Table 8, in a conference room environment—LOS, STA-AP case, it will be understood that an equalizer scheme according to an embodiment of the present disclosure has a high probability of detecting an optimal reception sector compared to a full search scheme.

Distribution of a reception sector index determined in each scheme according to a simulation result in a conference room environment—LOS, STA-AP case as shown in Table 8 will be described with reference to FIG. 13.

Figure 13:
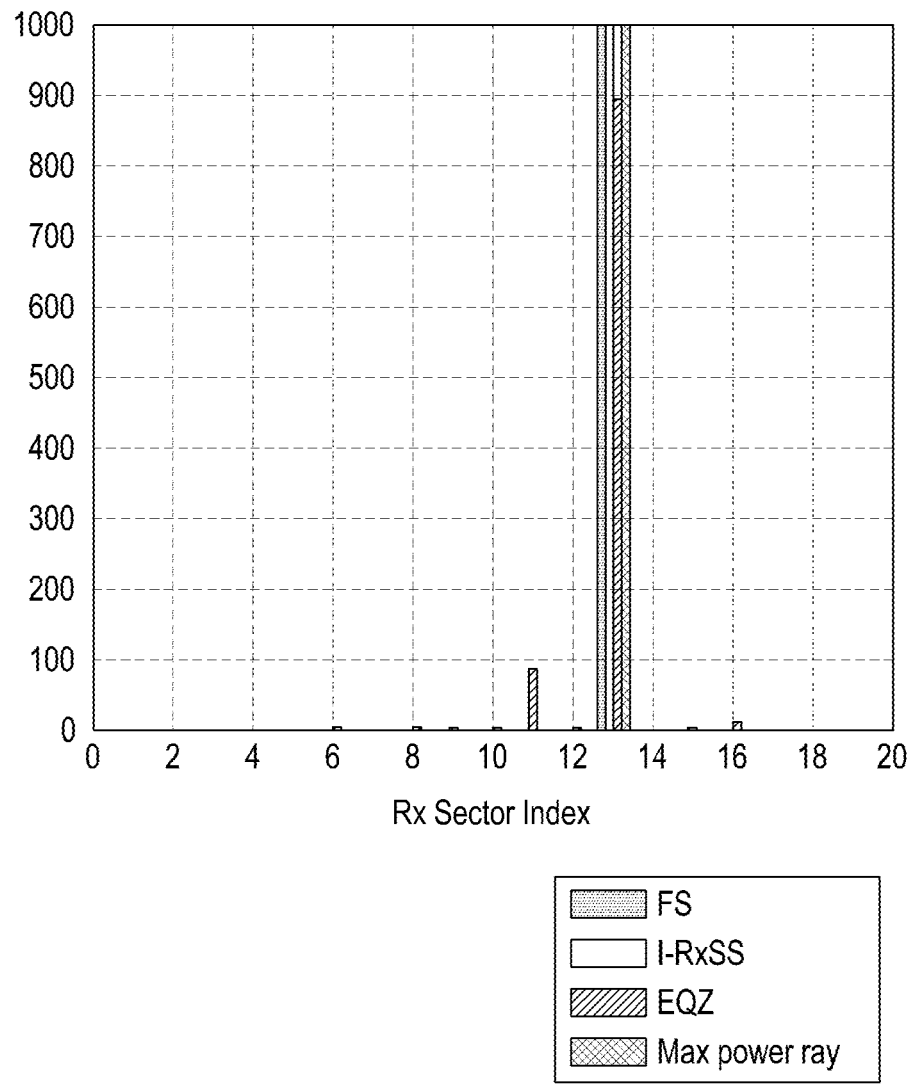
FIG. 13 is a histogram schematically illustrating performance of an equalizer scheme in a conference room environment—LOS, STA-AP case in an mmWave communication system according to an embodiment of the present disclosure.

FIG. 13 is a histogram schematically illustrating performance of an equalizer scheme in a conference room environment—LOS, STA-AP case in an mmWave communication system according to an embodiment of the present disclosure.

Referring to FIG. 13, FS indicates a full search scheme, I-RxSS indicates an I-TXSS & I-RXSS scheme, EQZ indicates an equalizer scheme, and Max power ray indicates a maximum power ray scheme.

As shown in FIG. 13, in a conference room environment—LOS, STA-AP case, it will be understood that an equalizer scheme according to an embodiment of the present disclosure has a high probability of detecting an optimal reception sector compared to a full search scheme.

Simulation results under the conference room environment—LOS case, i.e., simulation results as shown in Tables 7 and 8 and FIGS. 12 and 13 will be summarized below.

First, if there is an LOS path in a conference room environment, it will be understood that performance of an equalizer scheme according to an embodiment of the present disclosure is excellent in both an STA-STA case and an STA-AP case. It will be understood that a reception sector including an LOS path is a sector #1 in the STA-STA case and a reception sector including an LOS path is a sector #13 in the STA-AP case, and an optimal reception sector of an STA is the sector #1 in the STA-STA case and an optimal reception sector of the STA is the sector #13 in the STA-AP case.

Like this, if an optimal reception sector is concentrated on one sector, it will be understood that performance of the equalizer scheme is excellent.

Eighthly, a simulation result in a conference room environment—NLOS, STA-STA case will be shown as Table 9.

TABLE 9

|  | Full search | I-TxSS & I-RxSS | Equalizer | Maximum power ray | Qmni mode receiver |
|---|---|---|---|---|---|
| Rate | 4.28 | 3.60 | 2.37 | 1.60 | 2.02 |
| Mean of angle gap[°] | 0 | 14.7 | 34.5 | — | — |
| Matching probability | 1 | 0.75 | 0.34 | — | — |

As shown in Table 9, in a conference room environment—NLOS, STA-STA case, it will be understood that an equalizer scheme according to an embodiment of the present disclosure has a high probability of detecting an optimal reception sector compared to a full search scheme.

Distribution of a reception sector index determined in each scheme according to a simulation result in a conference room environment—NLOS, STA-STA case as shown in Table 9 will be described with reference to FIG. 14.

Figure 14:
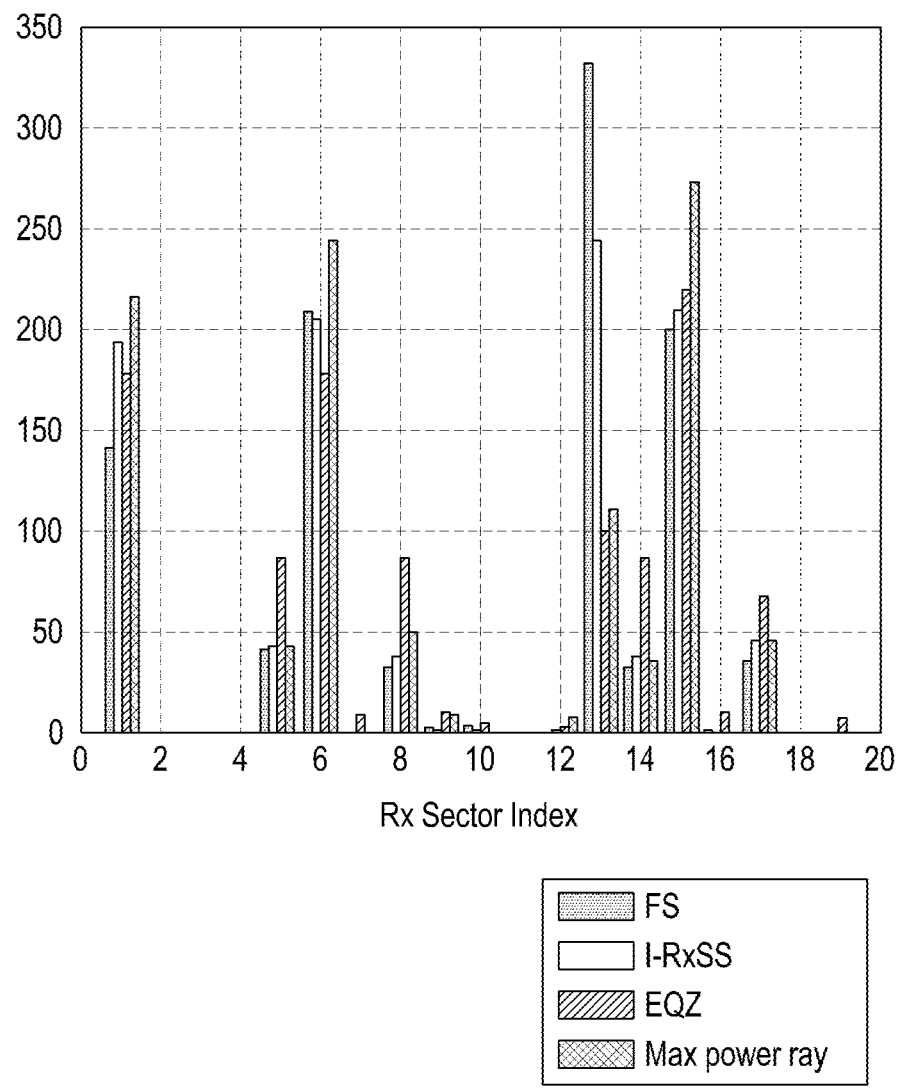
FIG. 14 is a histogram schematically illustrating performance of an equalizer scheme in a conference room environment—NLOS, STA-STA case in an mmWave communication system according to an embodiment of the present disclosure.

FIG. 14 is a histogram schematically illustrating performance of an equalizer scheme in a conference room environment—NLOS, STA-STA case in an mmWave communication system according to an embodiment of the present disclosure.

Referring to FIG. 14, FS indicates a full search scheme, I-RxSS indicates an I-TXSS & I-RXSS scheme, EQZ indicates an equalizer scheme, and Max power ray indicates a maximum power ray scheme.

As shown in FIG. 14, in a conference room environment—NLOS, STA-STA case, it will be understood that an equalizer scheme according to an embodiment of the present disclosure has a high probability of detecting an optimal reception sector compared to a full search scheme.

Ninthly, a simulation result in a conference room environment—NLOS, STA-AP case will be shown as Table 10.

TABLE 10

|  | Full search | I-TxSS & I-RxSS | Equalizer | Maximum power ray | Omni mode receiver |
|---|---|---|---|---|---|
| Rate | 4.65 | 4.11 | 3.09 | 1.88 | 2.29 |
| Mean of angle gap[°] | 0 | 11.2 | 26.5 | — | — |
| Matching probability | 1 | 0.76 | 0.41 | — | — |

As shown in Table 10, in a conference room environment—NLOS, STA-AP case, it will be understood that an equalizer scheme according to an embodiment of the present disclosure has a high probability of detecting an optimal reception sector compared to a full search scheme.

Distribution of a reception sector index determined in each scheme according to a simulation result in a conference room environment—NLOS, STA-AP case as shown in Table 10 will be described with reference to FIG. 15.

Figure 15:
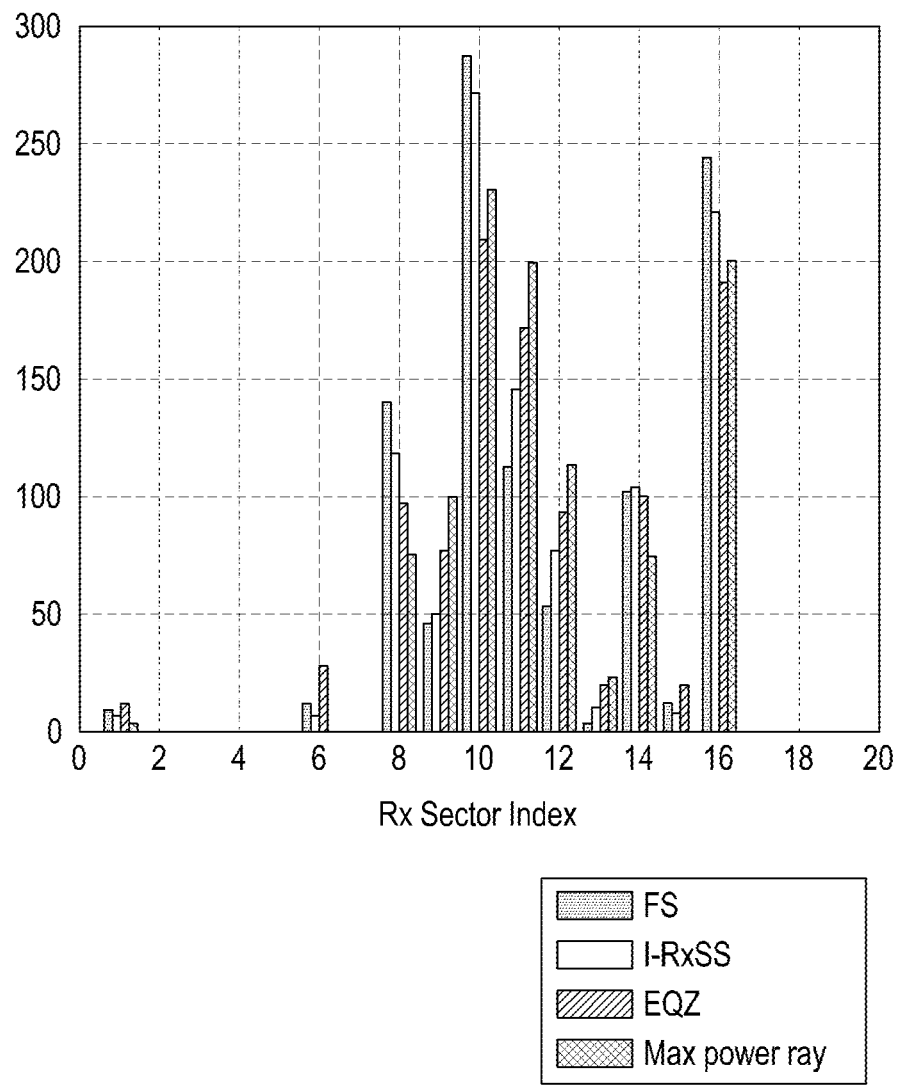
FIG. 15 is a histogram schematically illustrating performance of an equalizer scheme in a conference room environment—NLOS, STA-AP case in an mmWave communication system according to an embodiment of the present disclosure.

FIG. 15 is a histogram schematically illustrating performance of an equalizer scheme in a conference room environment—NLOS, STA-AP case in an mmWave communication system according to an embodiment of the present disclosure.

Referring to FIG. 15, FS indicates a full search scheme, I-RxSS indicates an I-TXSS & I-RXSS scheme, EQZ indicates an equalizer scheme, and Max power ray indicates a maximum power ray scheme.

As shown in FIG. 15, in a conference room environment—NLOS, STA-AP case, it will be understood that an equalizer scheme according to an embodiment of the present disclosure has a high probability of detecting an optimal reception sector compared to a full search scheme.

Simulation results under the conference room environment—NLOS case, i.e., simulation results as shown in Tables 9 and 10 and FIGS. 14 and 15 will be summarized below.

First, it will be understood that performance of an equalizer scheme significantly decreases in both an STA-STA case and an STA-AP if there is no LOS in the conference room environment. The reason why the performance of the equalizer scheme significantly decreases is that it is difficult that a channel is represented by one path due to various reflection paths which a channel model considers in the conference room environment. So, accuracy of an approximate expression of the equalizer scheme decreases and the performance of the equalizer scheme decreases.

So, an embodiment of the present disclosure has proposed an extended equalizer scheme for solving an performance decrease issue of the equalizer scheme, and the extended equalizer scheme may obtain enhanced performance compared to the equalizer scheme by additionally performing an I-TXSS process a plurality of times and applying an ordering scheme in an AP.

For checking performance enhancement of the extended equalizer scheme, in each NLOS scenario in a case that the extended equalizer scheme is applied to three NLOS scenarios which have the lowest performance when the equalizer scheme is used, it will be understood that a probability of detecting an optional reception sector in the extended equalizer scheme compared to a full search scheme is shown as Table 11.

TABLE 11

|  | Equalizer | 3 I-TxSS | 4 I-TxSS |
|---|---|---|---|
| CR, NLOS STA-STA | 0.34 | 0.51 | 0.58 |
| CR, NLOS STA-AP | 0.41 | 0.61 | 0.67 |
| LR, NLOS | 0.61 | 0.83 | 0.86 |

In Table 11, 3 I-TxSS indicates a result in a case that an optimal reception sector is detected using an extended equalizer scheme in which an equalizer scheme is performed and an ordering scheme is performed, and 4 I-TxSS indicates a result in a case that an optimal reception sector is detected using additional one ordering scheme and the result in 3 I-TxSS.

In the three NLOS scenarios as shown in Table 11, it will be understood that a probability that an optimal reception sector in a 3 I-TxSS case increases by about 50% compared to a case that only the equalizer scheme is used.

An inner structure of an AP in a communication system supporting a beamforming scheme according to an embodiment of the present disclosure will be described below.

Figure 16:
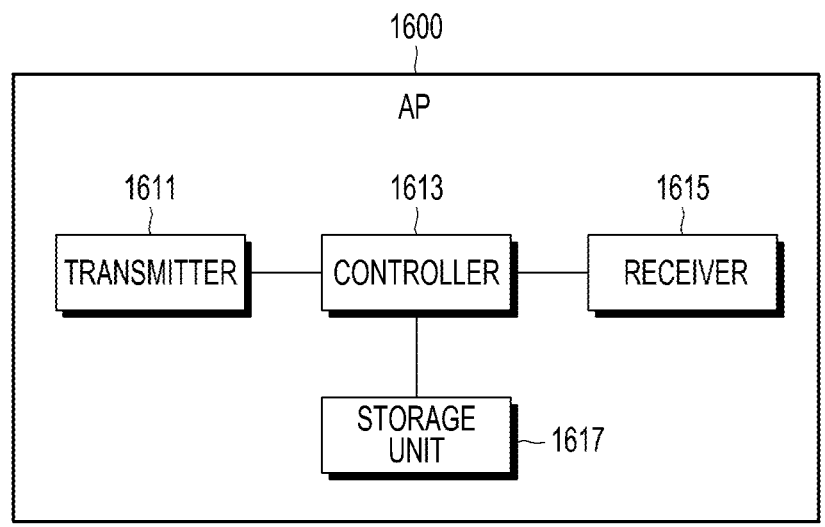
FIG. 16 schematically illustrates an inner structure of an AP in a communication system supporting a beamforming scheme according to an embodiment of the present disclosure.

FIG. 16 schematically illustrates an inner structure of an AP in a communication system supporting a beamforming scheme according to an embodiment of the present disclosure.

Referring to FIG. 16, an AP 1600 includes a transmitter 1611, a controller 1613, a receiver 1615, and a storage unit 1617.

The controller 1613 controls an overall operation of the AP 1600, e.g., an operation related to an operation of performing a beam selecting process in a communication system supporting a beamforming scheme according to an embodiment of the present disclosure. The operation related to the operation of performing the beam selecting process in the communication system supporting the beamforming scheme according to an embodiment of the present disclosure has been described with FIGS. 1 to 15, and a detailed description thereof will be omitted herein.

The transmitter 1611 transmits various signals and various messages to other entities included in the communication system supporting the beamforming scheme, e.g., an STA and/or the like under a control of the controller 1613. The various signals and the various messages transmitted in the transmitter 1611 have been described with reference to FIGS. 1 to 15, and a detailed description thereof will be omitted herein.

The receiver 1615 receives various signals and various messages from the other entities included in the communication system supporting the beamforming scheme, e.g., the STA and/or the like under a control of the controller 1613. The various signals and the various messages received in the receiver 1615 have been described with reference to FIGS. 1 to 15, and a detailed description thereof will be omitted herein.

The storage unit 1617 stores a program, various data, and/or the like related to an operation related to an operation of performing a beam selecting process in a communication system supporting a beamforming scheme according to an embodiment of the present disclosure under a control of the controller 1613.

The storage unit 1617 stores various signals and various messages which are received by the receiver 1615 from the other entities.

While the transmitter 1611, the controller 1613, the receiver 1615, and the storage unit 1617 are described in the AP 1600 as separate units in FIG. 16, however, the AP 1600 may be implemented as a form in which at least two the transmitter 1611, the controller 1613, the receiver 1615, and the storage unit 1617 are integrated.

The AP 1600 may be implemented with one processor.

An inner structure of an AP in a communication system supporting a beamforming scheme according to an embodiment of the present disclosure has been described with reference to FIG. 16, and an inner structure of an STA in a communication system supporting a beamforming scheme according to an embodiment of the present disclosure will be described with reference to FIG. 17.

Figure 17:
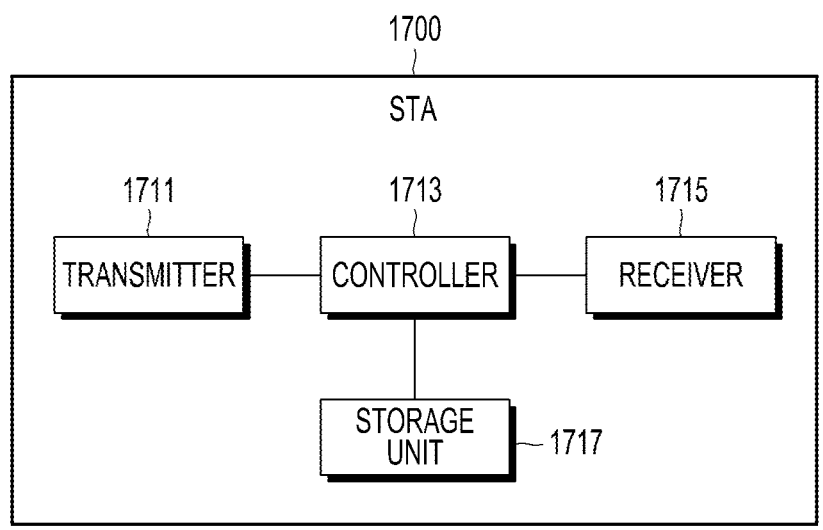
FIG. 17 schematically illustrates an inner structure of an STA in a communication system supporting a beamforming scheme according to an embodiment of the present disclosure.

FIG. 17 schematically illustrates an inner structure of an STA in a communication system supporting a beamforming scheme according to an embodiment of the present disclosure.

Referring to FIG. 17, an STA 1700 includes a transmitter 1711, a controller 1713, a receiver 1715, and a storage unit 1717.

The controller 1713 controls an overall operation of the STA 1700, e.g., an operation related to an operation of performing a beam selecting process in a communication system supporting a beamforming scheme according to an embodiment of the present disclosure. The operation related to the operation of performing the beam selecting process in the communication system supporting the beamforming scheme according to an embodiment of the present disclosure has been described with FIGS. 1 to 15, and a detailed description thereof will be omitted herein.

The transmitter 1711 transmits various signals and various messages to other entities included in the communication system supporting the beamforming scheme, e.g., an AP and/or the like under a control of the controller 1713. The various signals and the various messages transmitted in the transmitter 1711 have been described with reference to FIGS. 1 to 15, and a detailed description thereof will be omitted herein.

The receiver 1715 receives various signals and various messages from the other entities included in the communication system supporting the beamforming scheme, e.g., the AP and/or the like under a control of the controller 1713. The various signals and the various messages received in the receiver 1715 have been described with reference to FIGS. 1 to 15, and a detailed description thereof will be omitted herein.

The storage unit 1717 stores a program, various data, and/or the like related to an operation related to an operation of performing a beam selecting process in a communication system supporting a beamforming scheme according to an embodiment of the present disclosure under a control of the controller 1713.

The storage unit 1717 stores various signals and various messages which are received by the receiver 1715 from the other entities.

While the transmitter 1711, the controller 1713, the receiver 1715, and the storage unit 1717 are described in the STA 1700 as separate units in FIG. 17, however, the STA 1700 may be implemented as a form in which at least two the transmitter 1711, the controller 1713, the receiver 1715, and the storage unit 1717 are integrated.

The STA 1700 may be implemented with one processor.

An inner structure of an STA in a communication system supporting a beamforming scheme according to an embodiment of the present disclosure has been described with reference to FIG. 17, and an operating process of an AP in a communication system supporting a beamforming scheme according to an embodiment of the present disclosure will be described with reference to FIG. 18.

Figure 18:
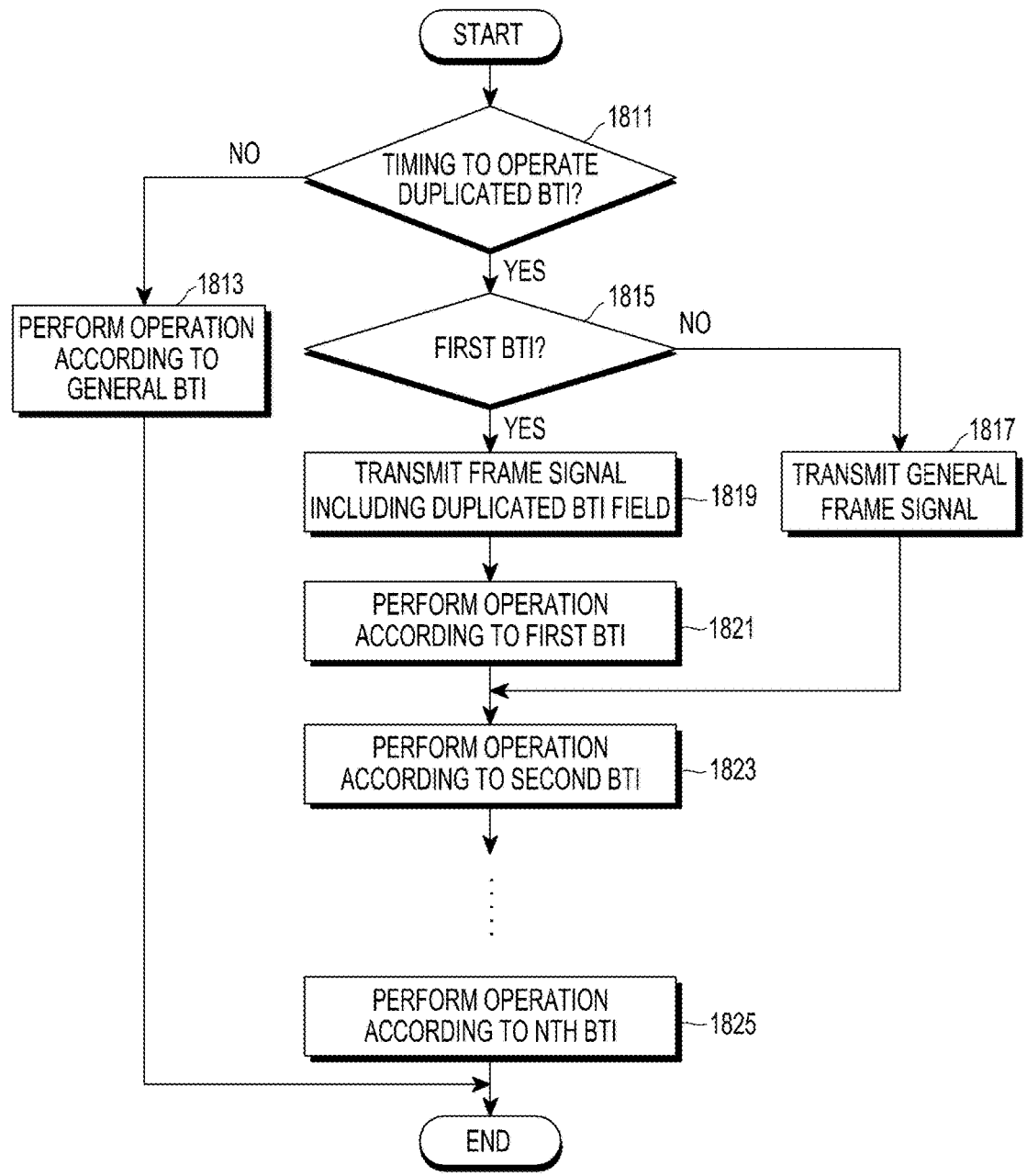
FIG. 18 schematically illustrates an operating process of an AP in a communication system supporting a beamforming scheme according to an embodiment of the present disclosure.

FIG. 18 schematically illustrates an operating process of an AP in a communication system supporting a beamforming scheme according to an embodiment of the present disclosure.

First, an AP determines whether a corresponding timing is a timing at which a duplicated BTI is operated at operation 1811. If the corresponding timing is not the timing at which the duplicated BTI is operated, the AP proceeds to operation 1813. The AP performs an operation according to a general BTI at operation 1813.

If the corresponding timing is the timing at which the duplicated BTI is operated, the AP proceeds to operation 1815. The AP determines whether the corresponding timing is a timing which corresponds to the first BTI among BTIs included in the duplicated BTI at operation 1815. If the corresponding timing is not the timing which corresponds to the first BTI among the BTIs included in the duplicated BTI, the AP proceeds to operation 1817. The AP transmits a general frame signal, i.e., a frame signal in which a duplicated BTI field is not included, and proceeds to operation 1823. A case that the general frame signal does not include the duplicated BTI field has been described in FIG. 18, however, if all frame signals include the duplicated BTI field, an operation thereof may be classified based on a field value of the duplicated BTI field.

If the corresponding timing is the timing which corresponds to the first BTI among the BTIs included in the duplicated BTI, the AP proceeds to operation 1819. The AP transmits a frame signal including the duplicated BTI field, and proceeds to operation 1821. The AP performs an operation according to the first BTI at operation 1821, and proceeds to operation 1823. An operation of the AP according to the first BTI of the duplicated BTI has been described above, and a detailed description thereof will be omitted herein.

The AP performs an operation according to the second BTI at operation 1823, and proceeds to operation 1825. An operation of the AP according to the second BTI of the duplicated BTI has been described above, and a detailed description thereof will be omitted herein. In this way, the AP performs an operation according to the Nth BTI at operation 1825. An operation according to the Nth BTI of the duplicated BTI, i.e., an operation of the AP according to a BTI after the first BTI and the second BTI has been described above, and a detailed description thereof will be omitted herein.

Although FIG. 18 illustrates an operating process of an AP in a communication system supporting a beamforming scheme according to an embodiment of the present disclosure, various changes could be made to FIG. 18. For example, although shown as a series of operations, various operations in FIG. 18 could overlap, occur in parallel, occur in a different order, or occur multiple times.

An operating process of an AP in a communication system supporting a beamforming scheme according to an embodiment of the present disclosure has been described with reference to FIG. 18, and an operating process of an STA in a communication system supporting a beamforming scheme according to an embodiment of the present disclosure will be described with reference to FIG. 19.

Figure 19:
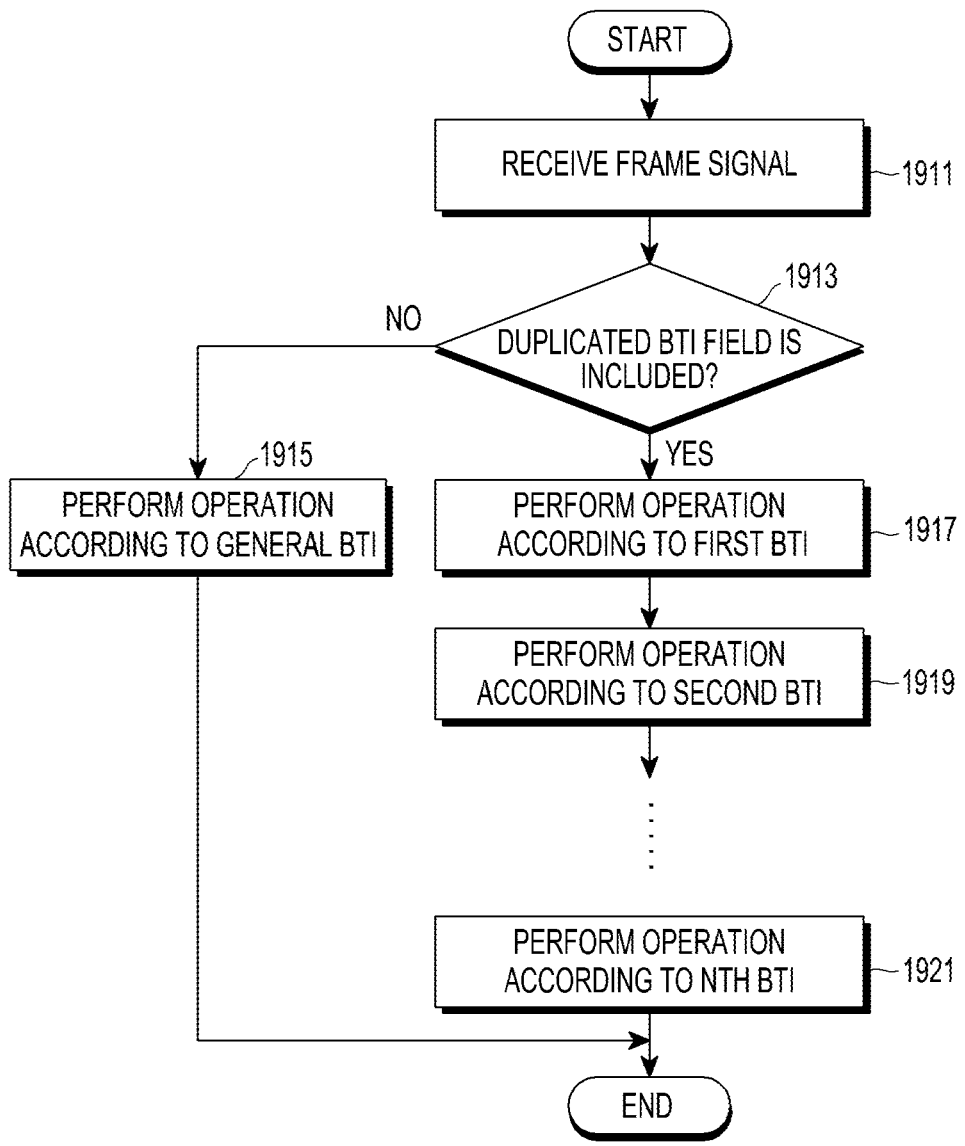
FIG. 19 schematically illustrates an operating process of an STA in a communication system supporting a beamforming scheme according to an embodiment of the present disclosure.

FIG. 19 schematically illustrates an operating process of an STA in a communication system supporting a beamforming scheme according to an embodiment of the present disclosure.

First, an STA receives a frame signal at operation 1911, and proceeds to operation 1913. The STA determines whether a duplicated BTI field is included in the received frame signal at operation 1913. If the duplicated BTI field is not included in the received frame signal, the STA proceeds to operation 1915. The STA performs an operation according to a general BTI at operation 1915.

If the duplicated BTI field is included in the received frame signal at operation 1913, the STA proceeds to operation 1917. A case that a general frame signal does not include the duplicated BTI field has been described in FIG. 19, however, if all frame signals include the duplicated BTI field, an operation thereof may be classified based on a field value of the duplicated BTI field.

The STA performs an operation according to the first BTI at operation 1917, and proceeds to operation 1919. An operation of the STA according to the first BTI of the duplicated BTI has been described above, and a detailed description thereof will be omitted herein.

The STA performs an operation according to the second BTI at operation 1919, and proceeds to operation 1921. An operation of the STA according to the second BTI of the duplicated BTI has been described above, and a detailed description thereof will be omitted herein. In this way, the STA performs an operation according to the Nth BTI at operation 1923. An operation according to the Nth BTI of the duplicated BTI, i.e., an operation of the STA according to a BTI after the first BTI and the second BTI has been described above, and a detailed description thereof will be omitted herein.

Although FIG. 19 illustrates an operating process of an STA in a communication system supporting a beamforming scheme according to an embodiment of the present disclosure, various changes could be made to FIG. 19. For example, although shown as a series of operations, various operations in FIG. 19 could overlap, occur in parallel, occur in a different order, or occur multiple times.

Certain aspects of the present disclosure may also be embodied as computer readable code on a non-transitory computer readable recording medium. A non-transitory computer readable recording medium is any data storage device that can store data, which can be thereafter read by a computer system. Examples of the non-transitory computer readable recording medium include read only memory (ROM), random access memory (RAM), CD-ROMs, magnetic tapes, floppy disks, optical data storage devices, and carrier waves (such as data transmission through the Internet). The non-transitory computer readable recording medium can also be distributed over network coupled computer systems so that the computer readable code is stored and executed in a distributed fashion. In addition, functional programs, code, and code segments for accomplishing the present disclosure can be easily construed by programmers skilled in the art to which the present disclosure pertains.

It can be appreciated that a method and apparatus according to an embodiment of the present disclosure may be implemented by hardware, software and/or a combination thereof. The software may be stored in a non-volatile storage, for example, an erasable or re-writable ROM, a memory, for example, a RAM, a memory chip, a memory device, or a memory integrated circuit (IC), or an optically or magnetically recordable non-transitory machine-readable (e.g., computer-readable), storage medium (e.g., a compact disk (CD), a digital video disc (DVD), a magnetic disk, a magnetic tape, and/or the like). A method and apparatus according to an embodiment of the present disclosure may be implemented by a computer or a mobile terminal that includes a controller and a memory, and the memory may be an example of a non-transitory machine-readable (e.g., computer-readable), storage medium suitable to store a program or programs including instructions for implementing various embodiments of the present disclosure.

The present disclosure may include a program including code for implementing the apparatus and method as defined by the appended claims, and a non-transitory machine-readable (e.g., computer-readable), storage medium storing the program. The program may be electronically transferred via any media, such as communication signals, which are transmitted through wired and/or wireless connections, and the present disclosure may include their equivalents.

An apparatus according to an embodiment of the present disclosure may receive the program from a program providing device which is connected to the apparatus via a wire or a wireless and store the program. The program providing device may include a memory for storing instructions which instruct to perform a content protect method which has been already installed, information necessary for the content protect method, and the like, a communication unit for performing a wired or a wireless communication with a graphic processing device, and a controller for transmitting a related program to a transmitting/receiving device based on a request of the graphic processing device or automatically transmitting the related program to the transmitting/receiving device.

While the present disclosure has been shown and described with reference to various embodiments thereof, it will be understood by those skilled in the art that various changes in form and details may be made therein without departing from the spirit and scope of the present disclosure as defined by the appended claims and their equivalents.

The invention claimed is:

1. A method for selecting a beam by an access point (AP) in a communication system, comprising:
   transmitting information indicating whether to operate a duplicated beacon transmit interval (BTI); and
   performing a transmit sector sweep (TXSS) process at least twice during the duplicated BTI.

2. The method of claim 1, wherein the information indicating whether to operate the duplicated BTI is included in a duplicated BTI field included in a sector frame.

3. The method of claim 1, wherein a station (STA) which performs a communication with the AP in at least one of TXSS processes, except for a first TXSS process among TXSS processes performed during the duplicated BTI, performs a receive sector sweep (RXSS) process.

4. The method of claim 1, further comprising:
   performing a TXSS process at least once after performing the TXSS process at least twice during the duplicated BTI.

5. A method for selecting a beam by a station (STA) in a communication system, comprising:
   receiving information indicating whether to operate a duplicated beacon transmit interval (BTI); and
   performing a receive sector sweep (RXSS) process at least twice during the duplicated BTI.

6. The method of claim 5, wherein the information indicating whether to operate the duplicated BTI is included in a duplicated BTI field included in a sector frame.

7. The method of claim 5, wherein an access point (AP) which performs a communication with the STA performs a transmit sector sweep (TXSS) process at least twice.

8. The method of claim 5, further comprising:
   performing an RXSS process at least once after performing the RXSS process at least twice during the duplicated BTI.

9. The method of claim 5, wherein performing the RXSS process at least twice during the duplicated BTI comprises:
   performing a signal receiving process in an omni-directional (omni) reception mode in a first RXSS process; and
   performing a signal receiving process while randomly changing a reception sector in each unit time interval in a second RXSS process.

10. The method of claim 5, wherein performing the RXSS process at least twice during the duplicated BTI comprises:
    detecting an optimal transmission sector of an access point (AP) which performs a communication with the STA,
    ordering indexes of a transmission sector in an order of a magnitude of gain in a first RXSS process; and
    ordering indexes of a reception sector of the STA in an order of a magnitude of gain in a second RXSS process.

11. An access point (AP) in a communication system, comprising:
    a transceiver configured to transmit information indicating whether to operate a duplicated beacon transmit interval (BTI) and to perform a transmit sector sweep (TXSS) process at least twice during the duplicated BTI.

12. The AP of claim 11, wherein the information indicating whether to operate the duplicated BTI is included in a duplicated BTI field included in a sector frame.

13. The AP of claim 11, wherein a station (STA) which performs a communication with the AP in at least one of TXSS processes, except for a first TXSS process among TXSS processes performed during the duplicated BTI, performs a receive sector sweep (RXSS) process.

14. The AP of claim 11, wherein the transceiver is configured to perform a TXSS process at least once after performing the TXSS process at least twice during the duplicated BTI.

15. A station (STA) in a communication system, comprising:
- a transceiver configured to receive information indicating whether to operate a duplicated beacon transmit interval (BTI) and to perform a receive sector sweep (RXSS) process at least twice during the duplicated BTI.

16. The STA of claim 15, wherein the information indicating whether to operate the duplicated BTI is included in a duplicated BTI field included in a sector frame.

17. The STA of claim 15, wherein an access point (AP) which performs a communication with the STA performs a transmit sector sweep (TXSS) process at least twice.

18. The STA of claim 15, wherein the transceiver is configured to perform an RXSS process at least once after performing the RXSS process at least twice during the duplicated BTI.

19. The STA of claim 15, wherein the transceiver is configured:
- to perform a signal receiving process in an omni-directional (omni) reception mode in a first RXSS process, and
- to perform a signal receiving process while randomly changing a reception sector in each unit time interval in a second RXSS process.

20. The STA of claim 15, wherein the transceiver is configured:
- to detect an optimal transmission sector of an access point (AP) which performs a communication with the STA,
- to order indexes of a transmission sector in an order of a magnitude of gain in a first RXSS process, and
- to order indexes of a reception sector of the STA in an order of a magnitude of gain in a second RXSS process.

\* \* \* \* \*